United States Patent
Master et al.

(10) Patent No.: US 6,237,029 B1
(45) Date of Patent: May 22, 2001

(54) METHOD AND APPARATUS FOR ADAPTABLE DIGITAL PROTOCOL PROCESSING

(75) Inventors: Paul L. Master, Mountain View; William T. Hatley, San Jose; Walter J. Scheuermann II, Saratoga; Margaret J. Goodman, San Jose, all of CA (US)

(73) Assignee: ARGOSystems, Inc., Sunnyvale, CA (US)

( * ) Notice: Subject to any disclaimer, the term of this patent is extended or adjusted under 35 U.S.C. 154(b) by 0 days.

(21) Appl. No.: 08/606,714

(22) Filed: Feb. 26, 1996

(51) Int. Cl.[7] .................................................. G06F 13/00

(52) U.S. Cl. ............................ 709/217; 709/230; 710/105

(58) Field of Search ........................ 395/200.47, 200.49, 395/200.54, 200.6, 285; 709/217, 219, 224, 230; 710/105

(56) References Cited

U.S. PATENT DOCUMENTS

| | | | |
|---|---|---|---|
| 4,370,708 | 1/1983 | Bruce et al. | 364/200 |
| 4,527,012 | 7/1985 | Caplan et al. | 379/284 |
| 4,734,909 | 3/1988 | Bennett et al. | 370/85 |
| 4,825,438 | 4/1989 | Bennett et al. | 371/8 |
| 4,864,492 | 9/1989 | Blakely-Fogel et al. | 364/200 |
| 4,882,727 | 11/1989 | Williams et al. | 370/79 |
| 4,890,254 | 12/1989 | Cooley | 364/900 |
| 4,935,925 | 6/1990 | Williams et al. | 370/83 |
| 4,958,342 | 9/1990 | Williams et al. | 370/79 |
| 5,060,227 | 10/1991 | Finley et al. | 370/79 |
| 5,067,104 | 11/1991 | Krishnakumar et al. | 395/375 |
| 5,070,499 | 12/1991 | Maher et al. | 370/61 |
| 5,093,829 | 3/1992 | Maher | 370/85.8 |
| 5,113,391 | 5/1992 | Gupta et al. | 370/84 |
| 5,121,342 | 6/1992 | Szymborski et al. | 364/514 |
| 5,129,095 | 7/1992 | Davis et al. | 455/12.1 |
| 5,150,048 | 9/1992 | McAuliffe et al. | 324/158 R |
| 5,175,727 | 12/1992 | Maher et al. | 370/58.1 |
| 5,210,746 | 5/1993 | Maher et al. | 370/79 |
| 5,224,094 | 6/1993 | Maher | 370/62 |
| 5,228,038 | 7/1993 | Jestice et al. | 370/110.1 |
| 5,229,989 | 7/1993 | Maher et al. | 370/58.2 |
| 5,243,273 | 9/1993 | McAuliffe et al. | 324/158 R |
| 5,243,593 | 9/1993 | Timbs | 370/58.1 |
| 5,249,164 | 9/1993 | Koz | 358/21 |
| 5,260,970 | * 11/1993 | Henry et al. | 375/10 |
| 5,274,630 | 12/1993 | Jestice et al. | 370/58.1 |
| 5,291,479 | 3/1994 | Vaziri et al. | 370/58.2 |
| 5,291,511 | 3/1994 | Maher et al. | 370/85.1 |
| 5,305,317 | 4/1994 | Szczepanek | 370/85.5 |
| 5,309,428 | 5/1994 | Copley et al. | 370/17 |
| 5,341,498 | 8/1994 | Conner et al. | 395/600 |
| 5,343,311 | 8/1994 | Morag et al. | 358/518 |
| 5,347,524 | 9/1994 | I'Anson et al. | 371/29.1 |

(List continued on next page.)

OTHER PUBLICATIONS

Information Disclosure Statement submitted by Paul L. Master, dated Mar. 19, 1999.

Giga Operations—G800 High Bandwidth I/O Board Summary; Release 2.0; Jun. 23, 1994.

(List continued on next page.)

*Primary Examiner*—Zarni Maung
(74) *Attorney, Agent, or Firm*—Wilson Sonsini Goodrich & Rosati

(57) ABSTRACT

Processor methods and apparatus for adaptable network processing having speed advantages often associated with hardware implementations of network processing code or logic, as is often achieved using ASICs, for example, but at the same time having reconfigurability advantages often associated with software implementations of this code or logic. Methods and apparatus are described for adaptable hardware devices, such as a field programmable gate array (FPGA) or a circuit using FPGAs, to execute network processing code or logic. Methods and apparatus are described for using a software based device to program adaptable hardware devices to implement desired network processing code or logic.

36 Claims, 9 Drawing Sheets

U.S. PATENT DOCUMENTS

| | | | |
|---|---|---|---|
| 5,361,373 | 11/1994 | Gilson | 395/800 |
| 5,363,366 | 11/1994 | Wisdom, Jr. et al. | 370/13 |
| 5,365,513 | 11/1994 | Copley et al. | 370/17 |
| 5,365,514 | 11/1994 | Hershey et al. | 370/17 |
| 5,375,070 | 12/1994 | Hershey et al. | 364/550 |
| 5,375,159 * | 12/1994 | Williams | 379/23 |
| 5,381,348 | 1/1995 | Ernst et al. | 364/514 |
| 5,390,351 | 2/1995 | Di Giulio et al. | 395/725 |
| 5,408,614 | 4/1995 | Thornton et al. | 395/275 |
| 5,414,707 | 5/1995 | Johnston et al. | 370/79 |
| 5,422,909 | 6/1995 | Love et al. | 375/200 |
| 5,425,017 | 6/1995 | Copley et al. | 370/13 |
| 5,428,806 | 6/1995 | Pocrass | 395/800 |
| 5,434,629 | 7/1995 | Pearson et al. | 348/721 |
| 5,434,846 | 7/1995 | Tremel et al. | 370/13 |
| 5,438,614 | 8/1995 | Rozman et al. | 379/93 |
| 5,444,695 | 8/1995 | Copley et al. | 370/17 |
| 5,452,341 | 9/1995 | Sattar | 379/88 |
| 5,452,419 | 9/1995 | Di Giulio et al. | 395/200.01 |
| 5,455,827 | 10/1995 | Krause et al. | 370/68.1 |
| 5,457,410 | 10/1995 | Ting | 326/41 |
| 5,479,355 | 12/1995 | Hyduke | 364/488 |
| 5,485,455 | 1/1996 | Dobbins et al. | 370/60 |
| 5,487,101 | 1/1996 | Fletcher | 379/60 |
| 5,490,252 | 2/1996 | Macera et al. | 395/200.01 |
| 5,491,457 | 2/1996 | Feher | 332/103 |
| 5,491,690 | 2/1996 | Alfonsi et al. | 370/60 |
| 5,491,694 | 2/1996 | Oliver et al. | 370/85.4 |
| 5,493,689 | 2/1996 | Waclawsky et al. | 395/821 |
| 5,495,470 | 2/1996 | Tyburski et al. | 370/14 |
| 5,495,479 | 2/1996 | Galaand et al. | 370/60 |
| 5,495,522 | 2/1996 | Allen et al. | 379/202 |
| 5,497,373 | 3/1996 | Hulen et al. | 370/79 |
| 5,497,498 | 3/1996 | Taylor | 395/800 |
| 5,500,853 | 3/1996 | Engdahl et al. | 370/17 |
| 5,535,342 | 7/1996 | Taylor | 395/307 |
| 5,544,163 | 8/1996 | Madonna | 370/60.1 |
| 5,553,056 | 9/1996 | Bronte et al. | 370/13 |
| 5,557,616 | 9/1996 | Cadieux et al. | 370/105.1 |
| 5,574,724 | 11/1996 | Bales et al. | 370/68.1 |
| 5,581,228 | 12/1996 | Cadieux et al. | 340/146.2 |
| 5,587,723 | 12/1996 | Otake et al. | 345/118 |
| 5,590,127 | 12/1996 | Bales et al. | 370/260 |
| 5,594,473 | 1/1997 | Miner et al. | 345/199 |
| 5,602,828 | 2/1997 | Engdahl et al. | 370/228 |
| 5,603,043 | 2/1997 | Taylor et al. | 395/800 |
| 5,604,735 | 2/1997 | Levinson et al. | 370/360 |
| 5,619,597 | 4/1997 | Moreton | 382/296 |
| 5,625,759 | 4/1997 | Freeman | 395/114 |
| 5,640,502 | 6/1997 | Knox et al. | 395/507 |
| 5,652,875 | 7/1997 | Taylor | 395/500 |
| 5,857,109 | 1/1999 | Taylor | 395/800 |

OTHER PUBLICATIONS

G–800 Technical Summary revised Jun. 26, 1994, including X205 MOD, X210 MOD and X410 MOD Summaries.

Giga Operations–X210 MOD; Release 3.0; Rev. B; Nov. 22, 1994.

K. Bouazza, J. Champeau, P. Ng, B. Pottier and S. Rubinin; "Implementing Cellular Automata on the ArMen Machine"; Proceedings of the Workshop on Algorithms and Parallel VLSI Architectures II; 1992, pp. 317–322.

A. Linde, T. Nordstrom, and M. Taveniku; "Using FPGAs to Implement a Reconfigurable Highly Parallel Computer"; Field–Programmable Gate Arrays: Architectures and Tools for Rapid Prototyping. Second International Workshop on Field Programmable Logic and Applications; Aug. 1992; pp. 199–210.

J. Gray and T. Kean; "Configurable Hardware: A New Paradigm for Computation"; Decennial CalTech Conference on VLSI; Mar. 1989; pp. 279–295.

J. Arnold; "The Splash 2 Software Environment"; Proceedings of IEEE Workshop on {FPGA}s for Cutom Computing Machines; Apr. 1993; pp. 88–93.

C. Chou, S. Mohanakrishnan, and J. Evans; "FPGA Implementation of Digital Filters"; Proceedings of the Fourth International Conference on Signal Processing Applications and Technology; 1993; pp. 80–88.

D. Pryor, M. Thistle, and N. Shirazi; "Text Searching on Splash 2"; Proceedings of IEEE Workshop on {FPGA}s for Custom Computing Machines; Apr. 1993; pp. 172–177.

J. Arnold and D. Buell; "VHDL Programming on Splash 2"; More {FPGA}s : Proceedings of the 1993 International Workshop on Field–Programmable Logic and Applications; Sep. 1993; pp. 182–191.

F. Raimbault, D. Lavenier, S. Rubini, and B. Pottier; "Fine Grain Parallelism on a MIMD Machine Using FPGAs; Proceedings of IEEE Workshop on {FPGA}s for Custom Computing Machines"; Apr. 1993; pp. 2–8.

X. Ling and H. Amano; "WASMII: A Data Driven Computer on a Virtual Hardware"; Proceedings of IEEE Workshop on {FPGA}s for Custom Computing Machines; Apr. 1993; pp. 33–42.

S. Casselman; "Virtual Computing and The Virtual Computer"; Proceedings of IEEE Workshop on {FPGA}s for Custom Computing Machines; Apr. 1993; pp. 43–48.

P. French and R. Taylor; "A Self–Reconfiguring Processor"; Proceedings of IEEE Workshop on {FPGA}s for Custom Computing Machines; Apr. 1993; pp. 50–59.

S. Monaghan and C. Cowen; "Reconfigurable Multi–Bit Processor for DSP Applications in Statistical Physics"; Proceedings of IEEE Workshop on {FPGA}s for Custom Computing Machines; Apr. 1993; pp. 103–110.

P. Foulk; "Data–Folding in SRAM Configurable FPGAs"; Proceedings of IEEE Workshop on {FPGA}s for Custom Computing Machines; Apr. 1993; pp. 163–171.

P. Chan and M. Schlag; "Architectural Tradeoffs in Field––Programmable–Device–based Computing Systems"; Proceedings of IEEE Workshop on {FPGA}s for Custom Computing Machines; Apr. 1993; pp. 152–161.

I. Page and W. Luk; "Compiling Occam Into FPGAs"; FPGAs. International Workshop on Field Programmable Logic and Applications; Aep. 1991; pp. 271–283.

J. Eldredge and B. Hutchings; "Density Enhancement of a Neural Network USing FPGAs and Run–Time Reconfiguration"; Proceedings of IEEE Workshop on {FPGA}s for Custom Computing Machines; Apr. 1994; pp. 180–188.

M. Wirthlin, B. Hutchings and K Gilson; "The Nano Processor: A Low Resource Reconfigurable Processor"; Proceedings of IEEE Workshop on {FPGA}s for Custom Computing Machines; Apr. 1994; pp. 23–30.

F. Furtek, G. Stone, and I. Jones: "Labyrinth: A Homogeneous Computational Medium"; Proceedings of the IEEE Custom Integrated Cirucits Conference; May 1990; pp. 31.1–31.1.4.

B. Fawcett; "Applications of Reconfigurable Logic"; More {FGPAs}: Proceedings of the 1993 International Workshop on Field Programmable Logic and Applications; Sep. 1993; pp. 57–69.

J. Eldredge and B. Hutchings; "RRANN: The Run–Time Reconfiguration Artificial Neural Network"; Custom Integrated Circuits Conference; May 1994; pp. 77–80.

A. DeHon; "DPGA–Coupled Microproceesors: Commodity ICs for the Early 21st Century"; Proceedings of IEEE Workshop on {FPGA}s for Custom Computing Machines; Apr. 1994; pp. 31–39.

R. Lazarus and F. Meyer; "Realization of a Dynamically Reconfigurable Preprocessor"; Proceedings of the IEEE 1993 National Aerospace and Electronics Conference. {NAECON} 1993; Aug. 1993; pp. 74–80.

T. Korpiharhu, J. Viitanen, H. Kiminkinen, J. Takala, and K. Kaski; "TUTCA Configurable Logic Cell Array Architecture"; Proceedings of the Fourth Annual IEEE International ASIC Conference and Exhibit; Sep. 1991; pp. P3–3.1–P3–3.4.

D. Hill, B. Britton, B. Oswald, N. Woo, S. Singh, C. Chen, and B. Krambeck; "ORCA: A New Architecture for High–Performance FPGAs"; Field–Programmable Gate Arrays: Architectures and Tools for Rapid Prototyping. Second International Workshop on Field Programmable Logic and Applications; Aug. 1992; pp. 52–60.

B. Heeb and C. Pfister; "Chameleon: A Workstation of a Different Colour"; Field–Programmable Gate Arrays: Architectures and Tools for Rapid Prototyping. Second International Workshop on Field Programmable Logic and Applications; Aug. 1992; by pp. 152–161.

N. Howard and R. Taylor; "Reconfigurable Logic: Technology and Applications"; Computing & Control Engineering Journal; Sep. 1992; pp. 235–240.

S. Erdogan and A. Wahab; "Design of RM–nc: A Reconfigurable Neurocomputer for Massively Parallel–Pipelined Computations"; IJCNN International Joint Conference on Neural Networks; Jun. 1992; pp. 33–38.

B. Box; "Field Progammable Gate Array Based Reconfigurable Preprocessor"; Proceedings of IEEE Workshop on {FPGA}s for Custom Computing Machines; Apr. 1994; pp. 40–48.

K. Tse, T. Yuk, and S. Chan; "Implementation of the Data Encryption Standard Algorithm with FPGAs"; pp. 412–419.

A.L. Abott, P. Athanas, L. Chen, and R. Elliott; "Finding Lines and Building Pyramids with Splash 2"; Proceedings of IEEE Workshop on {FPGA}s for Custom Computing Machines; Apr. 1994; pp. 155–161.

N. Hastie and R. Cliff; "The Implementation of Hardware Subroutines on Field Programmable Gate Arrays"; Proceedings of the 12th Annual IEE 1990 Custom Integrated Circuits Conference—CICC '90; May 1990; pp. 31.4.1–31.4.4.

M. Gokhale and A. Marks; "Automatic Synthesis of Parallel Programs Targeted to Dynamically Reconfigurable Logic Arrays"; Field–Programamble Logic and Applications; Aug. 1995; pp. 399–408.

P. Athanas and A.L. Abbott; "Image Processing on a Custom Computing Platform"; Field–Programmable Logic: Architectures, Synthesis and Applications. 4th International Workshop on Field–Programmable Logic and Applications; Sep. 1994; pp. 156–167.

M. Bolotski, A. DeHon and T. Knight, Jr.; "Unifying FPGAs and SIMD Arrays"; FPGA '94—2nd International ACM/SIGDA Workshop on FPGAs; Mar. 1994; pp. 1–10.

Request for Proposal K3–95–0258, dated Feb. 24, 1995 from the Maryland Procurement Office of the U.S. Department of Defense.

ARGOSystems'Proposal for AS–49A PCM Protocol Server dated Feb. 24, 1995 in Response to Request for Proposal K3–95–0258 from the Maryland Procurement Office of the U.S. Department of Defense.

Material Inspection and Receiving Report; Contract Identification MDA904–95–C–3101, Invoice No. 14520–01, date shipped Sep. 11, 1995.

* cited by examiner

PDH Specifications

European

| Level | Rate (kbps) | Trib Factor | # of Chans | CCITT Spec | ETSI Spec | |
|---|---|---|---|---|---|---|
| 1 | 2048 | x1 | 30 | G.704, G.731 G.732, G.736 | | E1 |
| 2 | 8448 | x4 | 120 | G.704, G.741 G.742, G.744 G.745 | | E2 |
| 3 | 34368 | x4 | 480 | G.751, G.753 | | E3 |
| 4 | 139264 | x4 | 1920 | G.751, G.754 G.755 | | E4 |

North American

| Level | Rate (kbps) | Trib Factor | # of Chans | CCITT Spec | ANSI Spec | |
|---|---|---|---|---|---|---|
| 1 | 1544 | x1 | 24 | G.704, G.731 G.733, G.734 | | T1 |
| 2 | 6312 | x4 | 96 | G.704, G.731 G.743, G.746 | | T2 |
| 3 | 44736 | x7 | 672 | G.752 | | T3 |
| 4 | 274176 | x6 | 4032 | G.752 | | T4 |

Japanese

| Level | Rate (kbps) | Trib Factor | # of Chans | CCITT Spec | Spec | |
|---|---|---|---|---|---|---|
| 1 | 1544 | x1 | 24 | G.704, G.731 G.733, G.734 | | J1 J2 |
| 2 | 6312 | x4 | 96 | G.704, G.731 G.743, G.746 | | |
| 3 | 32064 | x5 | 480 | G.752 | | J3 |
| 4 | 97728 | x3 | 1440 | G.752 | | J4 |

FIG. 3a

METHOD AND APPARATUS FOR ADAPTABLE DIGITAL PROTOCOL PROCESSING

This disclosure includes a microfiche appendix. The microfiche appendix includes a total number of 29 fiche and a total number of 3,958 frames.

BACKGROUND OF THE INVENTION

1. Copyright Authorization

A portion of the disclosure this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

2. Field of the Invention

The invention relates generally to network processors, and more particularly to adaptable digital network processors that are capable of providing real time processing of high bandwidth networks carrying a variety of different and/or frequently changing digital network protocols, protocol encapsulations and/or multiplexing formats.

3. Description of the Related Art

Telecommunications traffic is increasing in terms of both quantity and transmission speed. At the same time, new and quickly evolving digital protocol standards, which may be encapsulated within one another, are yielding a wide variety of potential digital protocols which often must be processed at real-time rates.

"Processing" shall include, but is not limited to routing, multiplexing, demultiplexing, encapsulating and de-encapsulating, for example. It may also include other types of processing of digital information that may be needed in telecommunications systems. Routing shall refer to switching and moving information over a network using network protocols. Network shall refer to a system of devices, links and subsystems, for example, which provide a platform for communications. Protocol shall refer to rules or guidelines by which information is exchanged or understood between two devices. Multiplexing shall refer to the process of combining multiple individual channels of data into a single aggregate channel of data for sharing equipment and bandwidth. A channel shall refer to a stream of data. A multiplexing format may be thought of as a type of digital protocol. Demultiplexing, the reverse process of multiplexing, shall refer to the process of separating a single aggregate channel into multiple individual channels. Encapsulating shall refer to the function of putting data or information into a format required by a particular digital protocol or putting already encapsulated information into another digital protocol (nested encapsulation). Encapsulating may generally involve adding headers, trailers and error correction information to data, for example. De-encapsulating, the reverse process of encapsulating, shall refer to the process of removing information from an encapsulated format. Please see Naugle, M. *Network Protocol Handbook*, McGraw Hill 1994 for a discussion of digital protocols, encapsulation and examples of encapsulation techniques. This book is hereby incorporated herein in its entirety by this reference. For a more detailed discussion of multiplexing, please see Lee, B. Kang, M., Lee, J., *Broadband Telecommunications Technology*, Artech House, Inc., 1993, chapter 3. This book is hereby incorporated herein in its entirety by this reference.

Communication in a telecommunication system typically occurs using a transmission structure. Transmission structure shall refer to the structure that carries data streams between communicating devices. Transmission structures might include, but are not limited to, wires, cables, fiber optics, lines and radio, microwave or sound transmission systems, for example. Thus, a network might communicate data over a wire transmission structure, where the wire structure multiplexed using an "E3→4E2→16E1→512 channel" multiplexing format. The encapsulation format in one of the 512 channels may be SNA encapsulated within TCP/IP encapsulated within Frame Relay encapsulated within ATM, for example. The encapsulation format in a second of the 512 channels might be FTP encapsulated within TCP/IP encapsulated within X.25, for example. While multiplexing standards may vary from country to country, standardization of multiplexing formats typically has been more prevalent than standardization of protocols. In particular, multiplexing format specifications may be published by CCITT, IEEE or ISO, for example. FIG. 3*a* shows common multiplexing schemes based on their CCITT specification numbers. In general, the European formats typically are described as E1, E2 and so on, for example. The North American formats typically are described as T1, T2 and so on, for example. FIG. 3*b* shows a typical multiplexing structure. Unlike multiplexing formats, digital protocols may change frequently and/or rapidly.

Three trends in the telecommunications industry may be having an impact on network processing. The first trend may be a drastic increase in computer-to-computer digital traffic. An example of this growth may be found in the growth of the Internet.

The trend toward increasing computer-to-computer traffic does not appear limited to technologically developed countries. In particular, less developed countries may purchase state-of-the-art telecommunications systems, reasoning that they cannot attract multi-national businesses and compete in a world marketplace unless they possess a first-rate telecommunications infrastructure.

A second trend in the telecommunications industry may be a seemingly insatiable demand for bandwidth. With the "STM-N/STS-N/OC-N, N=1, 2, 3 . . . " standards, for example, it now may be possible to carry 155 Mbps or 622 Mbps data streams on wires and radios. On the fiber front, 155 Mbps, 622 Mbps, 2.4 Gbps, 5 Gbps or even higher bandwidth data streams may become available. Advanced development labs may be looking at the feasibility of 40 Gbps data streams per fiber. While the bandwidth of fiber optic cables typically has not been limited by physical characteristics of the fiber itself, fiber optic bandwidths may be limited by the electronics/photonics interfaces required to place and retrieve data on the fiber. Nonetheless, the bandwidth of fiber optic cables may continue to improve if the bandwidth of these interface circuits continues to improve.

A third trend in the telecommunications industry may be the continuing growth in number of ways that computer-to-computer traffic may be formatted and sent across networks. For example, Network General™, a company that sells LAN/WAN sniffers™, has published a Guide to Communications protocols documenting a multitude of unique digital protocols in use today. This Guide is hereby incorporated herein by this reference.

The number of different protocols may be further increased by a multitude of proprietary 'variants' of these protocols, as well as a constant introduction of new protocols. The current flux in the ATM Forums specification for the ATM protocol may be an example of this growth. In this area, major changed, new or variant protocols may be introduced on an average of once a month.

Computer-to-computer traffic is carried in the payload portion of various digital protocols in a unit of information called a packet. Payload shall refer to the data or information carried by a protocol. A packet shall refer to the basic unit of information transmitted on a network; i.e. an encapsulated payload. For further discussion of packets, please see Naugle, M. *Network Protocol Handbook*, McGraw Hill 1994, chapter 2, for example. See also, Lee, B. Kang, M., Lee, J., *Broadband Telecommunications Technology*, Artech House, Inc., 1993, chapter 1, sections 1.1.5 and 1.1.2. As these protocol packets traverse a network they may be further encapsulated within another digital protocol. Information that is already encapsulated may be encapsulated multiple additional times. Accordingly, a system that processes and/or analyzes network information often must be able to handle such nested encapsulation schemes. An ATM protocol, for example, may encapsulate a Frame Relay protocol, which may encapsulate a TCP/IP protocol which may encapsulate an SNA protocol. To properly process the payload carried by this original SNA protocol requires the recognition and de-encapsulation of ATM, Frame Relay, TCP/IP, and finally SNA.

Handling large amounts of this computer-to-computer traffic in the gigabit era may present problems. Assuming computer-to-computer traffic increases in the future, it may be desirable to carry data at bandwidths greater than 64 kbps. "Connection" shall refer to an association between two communicating stations using some kind of protocol such as E1 or T1 multiplexing or encapsulated protocols, for example. Connections may have to carry data streams at multi-megabit and multi-gigabit per second rates. With constantly changing protocols and encapsulation schemes, these increasing bandwidths may prevent conventional network processing equipment from processing computer-to-computer traffic in real time.

Three different conventional ways of processing digital network information may encounter difficulties under these conditions. In order of typical speed from fastest to slowest, conventional techniques for processing network information typically have included using Application Specific Integrated Circuits (ASICs), employing individual microprocessors and/or digital signal processing (DSP) chips running software, or doing non-real-time analysis on snapshot samples using software.

Traditionally, digital network processors typically use custom ASICs when they need to process data at real-time rates. These ASICs are custom chips designed from the ground up that implement the code or logic necessary to process network information. Whenever this code or logic is placed in a custom ASIC, the performance increase is typically several orders of magnitude greater than that which may be achieved in a software only implementation of that code or logic. The advantage of this approach is that it can process data streams in real time. The limitation of this approach is that the large number of possible protocols, the nesting of encapsulated protocols or the variety of multiplexing formats can make it difficult and expensive to produce ASICs to handle all of the possible protocols, encapsulations and multiplexings. Typically, ASICs have been developed to handle a few specific cases.

Conventional ASICs typically have limited flexibility. A change in an existing protocol due to a change in an encapsulation scheme or the advent of a new protocol, for example, may require a new and possibly expensive ASIC design. Mistakes uncovered during testing may add time and cost to the process of bringing an ASIC from design to production.

A second conventional way to process network information may be to run in software on either an individual microprocessor or a DSP chip the code or logic for processing network information. An advantage of implementing network processing code or logic in software is typically that software allows the code or logic to be readily changed when different encapsulation or multiplexing schemes or new protocols are used or developed, for example.

A disadvantage of implementing protocol processing code or logic in software is that usually only low speed data streams may be handled in this manner. A microprocessor and/or a DSP chip running such code or logic will typically not be fast enough to process a complex protocol at gigabit or even multi-megabit per second data rates, for example.

A third conventional way to process network information is to simply take a "snapshot" of the digital data stream. A snapshot is taken by downloading a part of a data stream into a large memory, such as a large RAM. This data then typically can be processed in a non-real-time manner to demultiplex, de-encapsulate and identify the digital protocols of interest, for example.

An advantage of using this "snapshot" technique is that the code or logic for processing the network information typically can be implemented in software. Again, software implementation of the code or logic typically facilitates changes which may be necessary when multiplexing formats, protocols and/or encapsulations are changed, for example. An additional advantage may be that because this technique does not require real time processing of the data stream, the software code or logic development task is eased. Unfortunately, this technique typically enables only processing of disjointed snapshots of digital data streams in time. This characteristic limits the use of this approach to network analysis where there is no need for real time, continuous, sustained processing.

Thus, there has been a need for a method and apparatus for digital network processing that is able to accomplish sustained, continuous and/or real time processing of network information but which can be reconfigured to handle different multiplexing formats, protocols and/or encapsulation schemes, for example, without the time or expense typically associated with creating a custom ASIC.

SUMMARY OF THE INVENTION

An aspect of the invention provides processor methods and apparatus for adaptable network processing having speed advantages often associated with hardware implementations of network processing code or logic, as is often achieved using ASICs, for example, but at the same time having reconfigurability advantages often associated with software implementations of this code or logic.

An aspect of the invention provides methods and apparatus for adaptable hardware devices, such as a field programmable gate array (FPGA) or a circuit using FPGAs, to execute network processing code or logic.

An aspect of the invention provides methods and apparatus for using a software based device to program adaptable hardware devices to implement desired network processing code or logic.

BRIEF DESCRIPTION OF THE DRAWINGS

FIG. 3a is a list of common multiplexing schemes;

DETAILED DESCRIPTION OF THE PREFERRED EMBODIMENTS

The present invention comprises a novel apparatus and method for processing digital network information. The following description is presented to enable a person skilled in the art to make and use the invention. Descriptions of specific applications are provided only as examples. Various modifications to the described embodiment will be readily apparent to those skilled in the art, and the generic principles defined herein may be applied to other embodiments and applications without departing from the spirit and scope of the invention. Thus, the present invention is not intended to be limited to the described or illustrated embodiments, but should be accorded the widest scope consistent with the principles and features disclosed herein.

Figure 1:
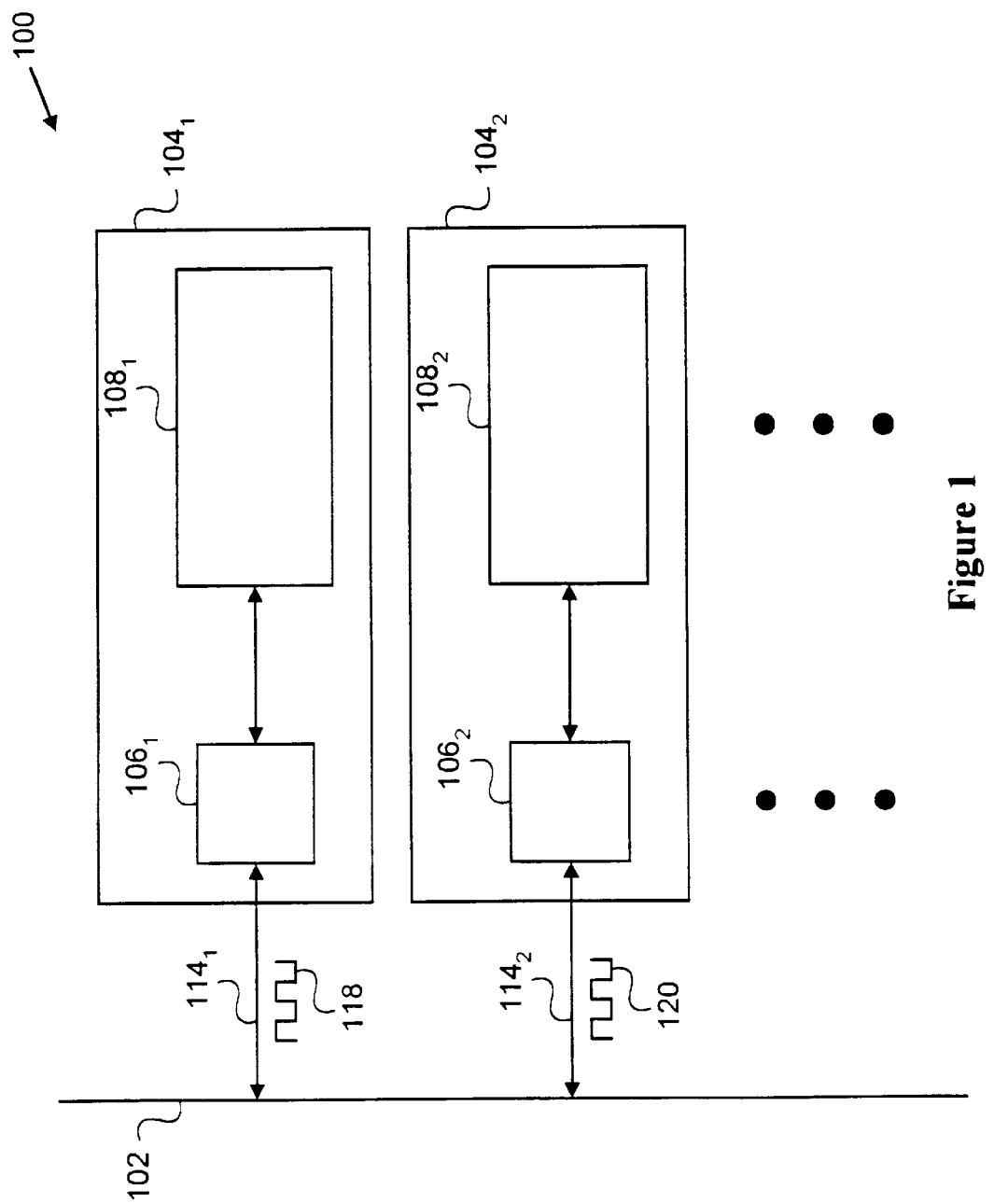
FIG. 1 illustrates a functional block diagram of a network 100.

FIG. 1 illustrates a block diagram of a conventional network 100. The network 100 includes a transmission structure 102 to which multiple nodes 104 may be connected. Node shall refer to a device that interfaces or is coupled with a transmission structure of a network. Each node of FIG. 1 contains an input/output module 106 and processing device 108. "Connections" 114 are coupled to the respective input/output modules 106 of each node 104. Connection $114_1$ may be carrying an E3 multiplexed data stream 118, for example. Connection $114_2$ may be carrying a T1 multiplexed data stream 120, for example. Input/output module shall refer to the interface between a transmission medium and a node and is intended to include any such interfaces that may be developed as future telecommunications systems are developed. In the present embodiment, the input/output modules 106 electrically terminate the connection coupled to them, and recover the data stream and clock from the connection. Input/output modules are typically designed to interface with a particular physical interface, such as an electrical interface, for example. The E3 input module 106 was purchased from Transwitch Corporation, of Shelton, Conn., Part No. TXC 21037 E2/E3F-EB. This part is listed in the List of Transwitch Products published by Transwitch Corporation, of Shelton, Conn., 1994, which list is hereby incorporated herein by this reference. The E1 input/output module is implemented using the GL Communications Inc. Super E1 Interface card. The data sheets for this Card can be obtained from GL Communications, Inc. of Gaithersburg, Md. and are hereby incorporated herein by this reference.

Figure 2:
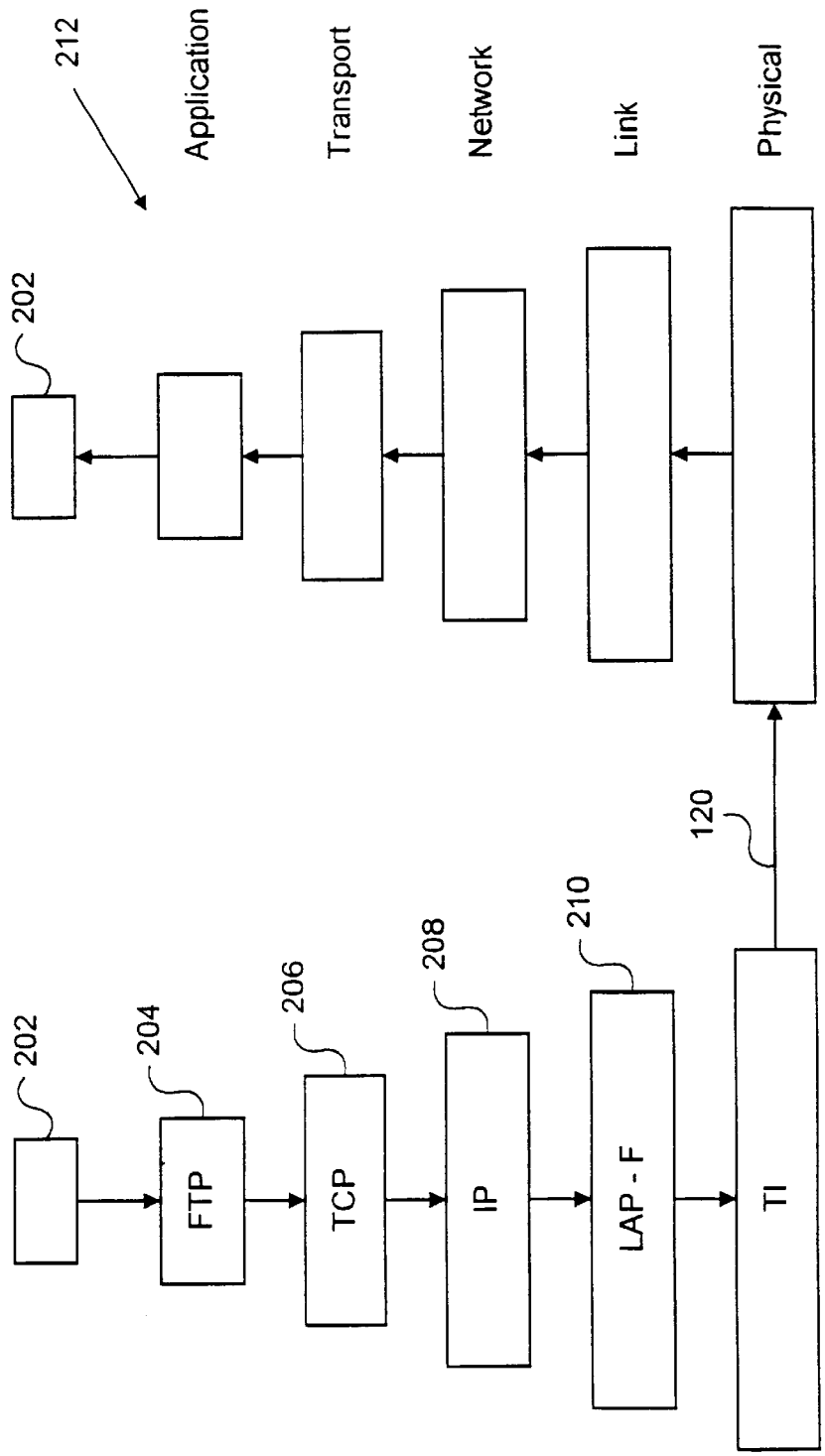
FIG. 2 illustrates a hierarchy showing the encapsulation and de-encapsulation of data or information in multiple levels.
Figure 3B:
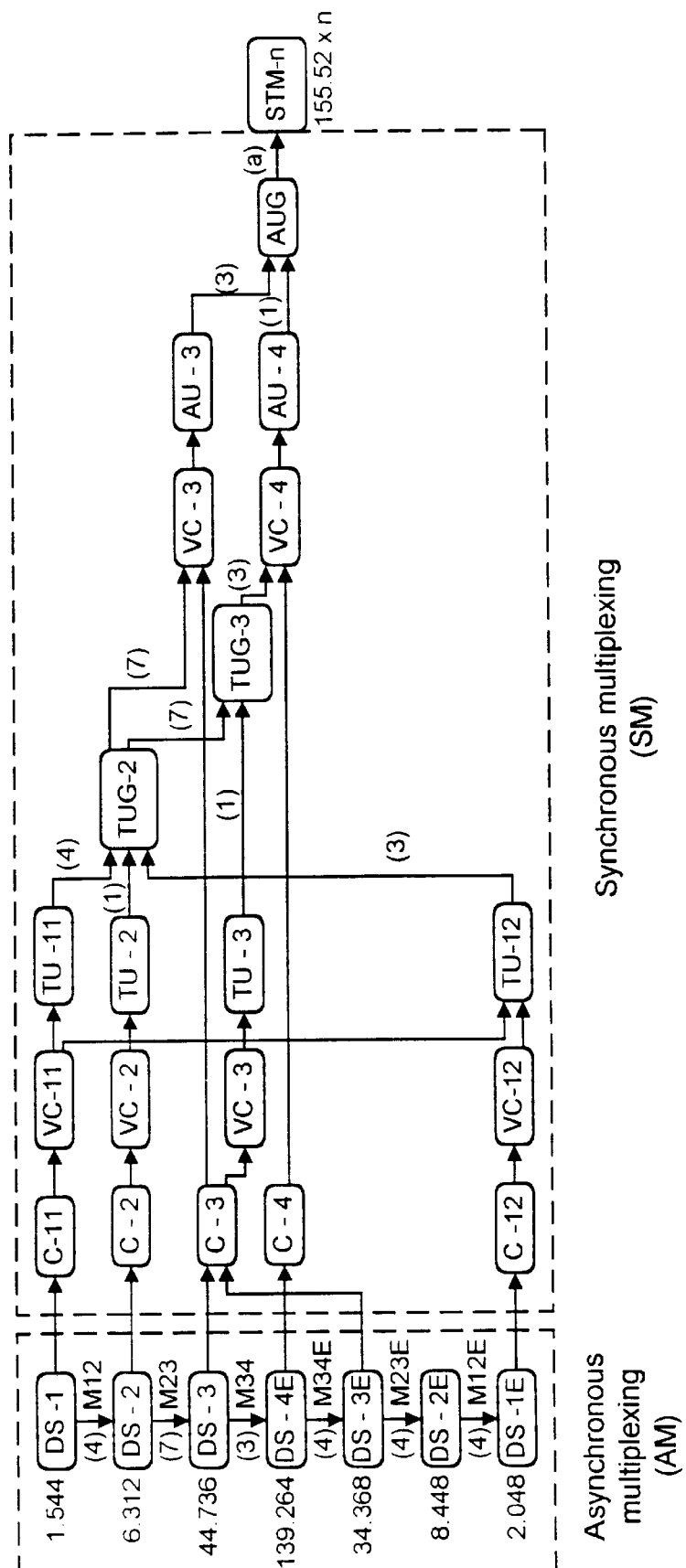
FIG. 3b is a typical multiplexing format.

As we have noted, computer-to-computer data transmitted over a network, for example, is typically transmitted using digital protocols and/or encapsulated protocols. FIG. 2 illustrates a hierarchy that is an example of data or information that has been encapsulated in multiple levels. In this figure, data or information 202 is encapsulated according to an FTP protocol to form FTP packet 204. Data or information 202 is the payload for FTP packet 204. FTP packet 204 is then encapsulated according to a TCP format to form TCP packet 206. FTP packet 204 is the payload for TCP packet 206. Similarly, TCP packet 206 is encapsulated to form IP packet 208 and IP packet 208 is encapsulated to form LAP-F packet 210. Packet 210 is then multiplexed into a T1 data stream 120 for transmission over a network, for example.

Referring back to FIG. 1, the T1 data stream 120 might be received by node $104_2$ in response to a request by this node for the data. Input/output module $106_2$ terminates connection $114_2$ and extracts the data stream and clock from this connection. In this case, the encapsulation hierarchy of the data stream is FTP encapsulated within TCP encapsulated within IP encapsulated LAP-F. Processing device $108_2$ can then de-encapsulate the data stream to obtain the data or information 202. Process 212 in FIG. 2 illustrates de-encapsulation of this data stream to obtain the data or information 202. Processing device 1082 may then use or manipulate the data as desired. The data might be a graphics file that can be displayed by processing device $108_2$, for example.

Processing device $108_2$ might implement the code or logic for demultiplexing and de-encapsulating data stream 120 using an ASIC or ASICs, for example. These ASICs typically will be designed to accomplish specific demultiplexing and de-encapsulation. Accordingly, an ASIC used by processor $108_2$ to demultiplex and de-encapsulate this T1 data stream might be unable to demultiplex an E3 data stream, for example.

In the alternative, processing device $108_2$ might implement the code or logic for demultiplexing and de-encapsulating data stream 120 in software, for example. Such an implementation often could be adapted to demultiplex an E3 data stream, for example. The software implementation, however, may be unable to process data stream 120 in real time given the E3 bandwidths. Higher bandwidth data streams, such as STM-1, may be even more difficult to process in real time.

Figure 4:
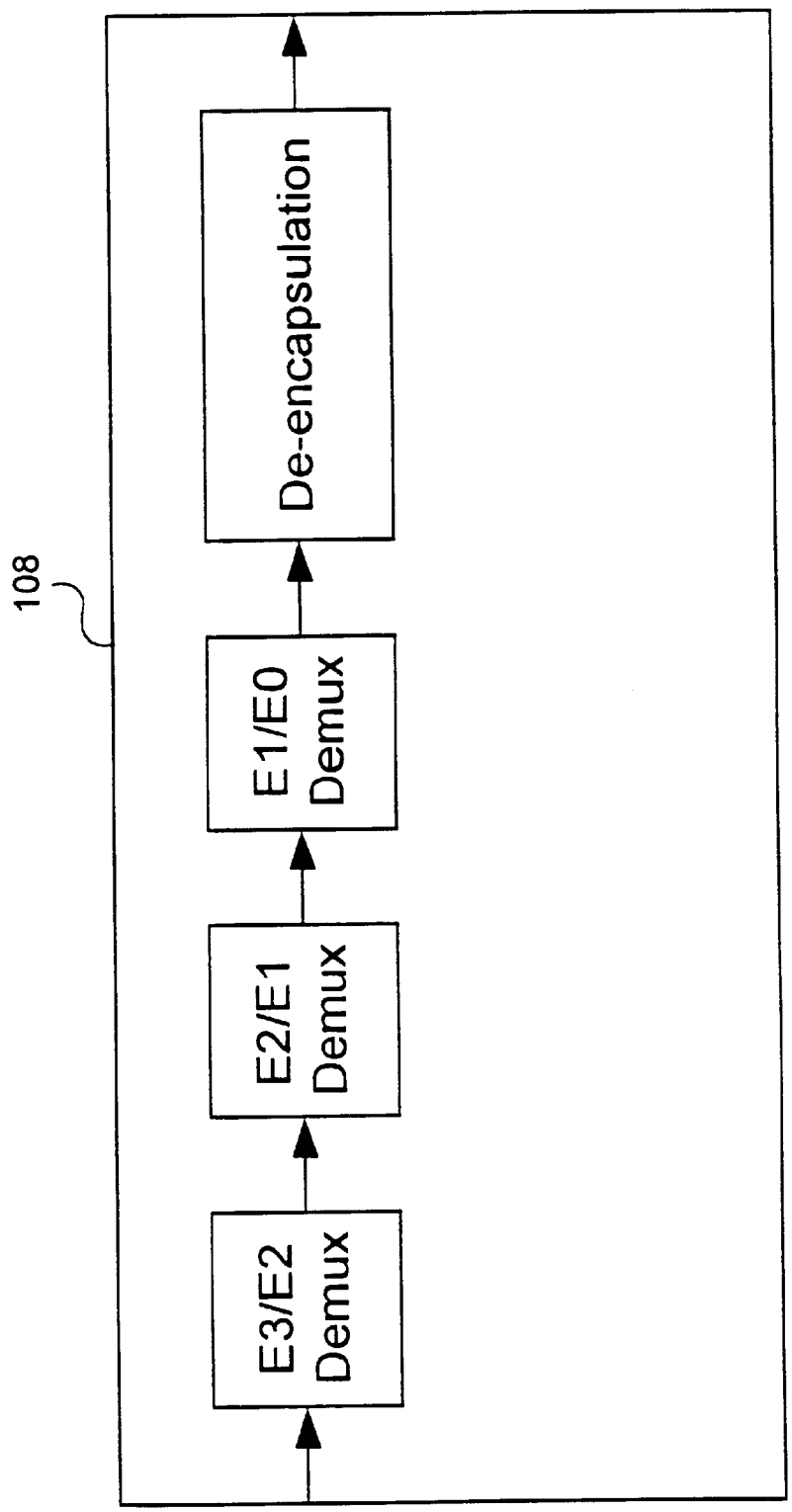
FIG. 4 is a functional block diagram of processing that may be accomplished by the network processor of FIG. 1.

FIG. 4 is a functional block diagram of demultiplexing and de-encapsulating that might be performed by a processing device 108. In the alternative, a processing device 108 might be designed to encapsulate and/or multiplex network data or information.

Figure 5:
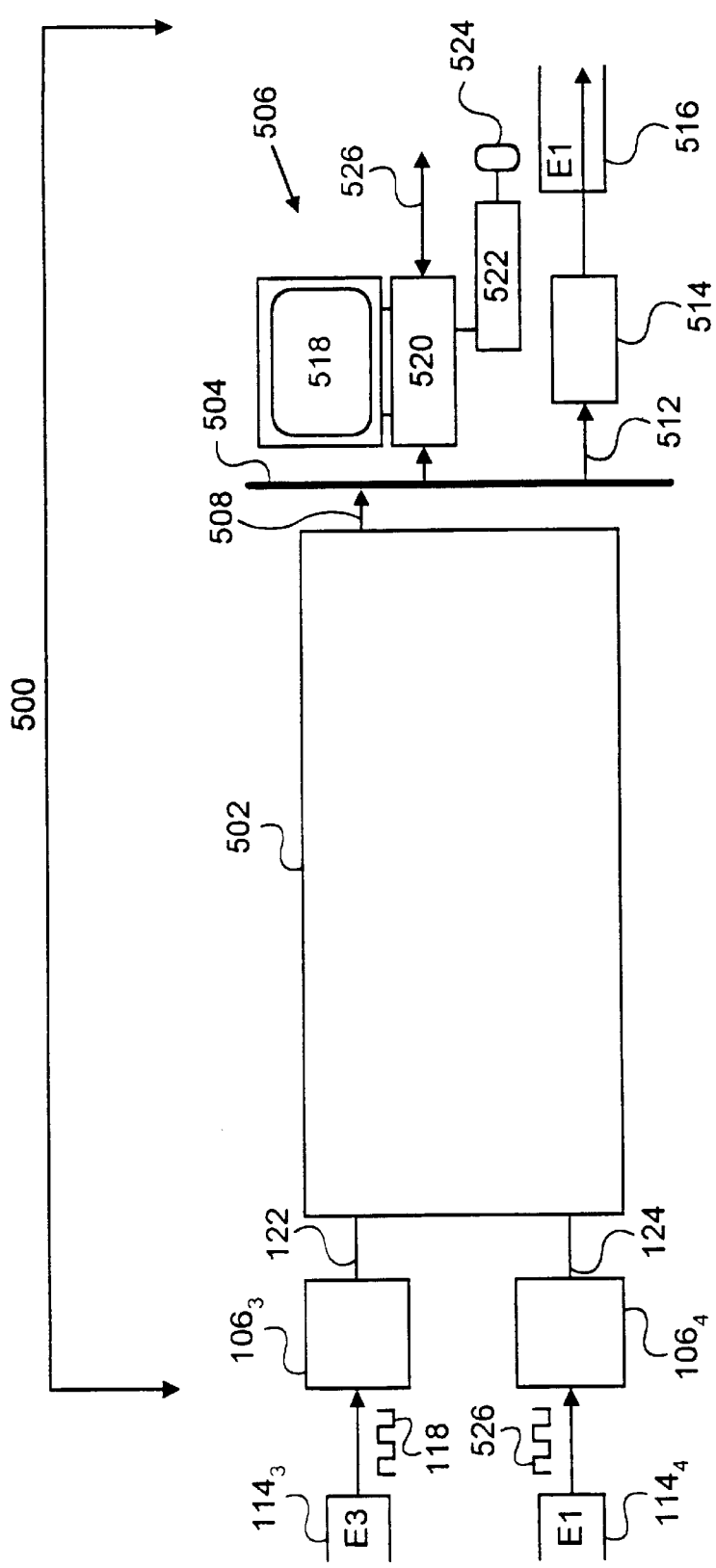
FIG. 5 is a block diagram of an adaptable network processor 500 which is an embodiment of the present invention.

FIG. 5 shows a network processing system 500 which is an embodiment of the present invention. Network processing system 500 is a node that uses an adaptable hardware device to process network data streams. Network processing system 500 implements a network analyzer; a device for observing and analyzing the format of network information. Embodiments of the present invention are not limited to network analysis, however. In particular, embodiments of the present invention may be used to facilitate or accomplish network communications. A network analysis system such as system 500 is available from ARGOSystems of Sunnyvale, Calif. as the AS-49A PCM Protocol Server running AS-1860 Protocol Analysis Workstation Software (PAWS). Please see the attached AS-49A Protocol Server and AS-1860 data sheets in Appendix A in the microfiche appendix for a discussion of these systems. These data sheets are hereby incorporated herein by this reference. Similar to the nodes 104 of FIG. 1, system 500 has input/output modules 106 coupled to connections $114_3$ and $114_4$. To accomplish demultiplexing and de-encapsulation, processor 500 uses an adaptable hardware device 502 rather than a processing device such as the processing devices 108 of FIG. 1. Connections 122 and 124 couple input/output modules 106 to adaptable hardware device 502. Accordingly a data stream from connections 114$_3$ and 114$_4$, for example, will be processed by input/output modules 106, for example, and passed through connections 122 and 124 to adaptable hardware device 502.

System 500 contains bus 504, which enables communication between the adaptable hardware device 502 and a computer system 506. Bus 504 also has output port 512 which can be used to provide a network data stream to a connection, such as the E1 connection 516 shown in FIG. 5, for example. Input/output module 514 couples output port 512 to E1 connection 516. Input/output module 514 is implemented using the GL Communications Inc. Super E1 Interface Card. This card remultiplexes channels into a data stream in an E1 format. A single E1 data stream from a demultiplexed E3 connection can be output via the E1 port 512. Optionally this port 512 provides an E1 output for any input channels of interest that need to be processed externally. Please see the attached AS-49A PCM Protocol Server data sheet in Appendix A in the microfiche appendix. Embodiments of the present invention are not limited to the particular configuration or bus architecture described.

Computer system 506 includes a monitor 518, a server 520, a keyboard 522 and mouse 524. The server 520 is implemented using an Intel Pentium™ based machine running a Windows N™ operating system and ARGOSystem's AS-1860 Protocol Analysis Workstation Software (PAWS), for example. PAWS software is available from ARGOSystems, Inc., located in Sunnyvale, Calif. The PAWS/AS-49 users manual is attached in Appendix B in the microfiche appendix, and is hereby incorporated herein by this reference. The PAWS/AS-49 manual should be referred to for an explanation of how to operate the software of System 500. The Windows NT™ operating system is available from Microsoft Corporation of Redmond, Washington. The server 520 has an internal hard disk drive, and it may be used with other storage devices. The server 520 may have a network port 526 which may be used to interface the server to an Ethernet Network, for example. Other embodiments of the present invention might interface to other types of networks using other types of PC interface cards. This port may be used for remote control of or printing information from computer system 506 and/or system 500, for example. Embodiments of the present invention are not limited to this precise computer system, however. Other systems that might be used include, but are not limited to, SPARC™ systems, DEC™ ALPHA™ systems, DEC™ UNIX™ systems, Microsoft™ Windows NT™ systems. Embodiments of the present invention may use any computer system that might be used to implement the adaptable network processing aspects disclosed in this specification. The PAWS software may be used with the AS-49 network processor sold by ARGOSystems.

The system 500 might receive input from E3 connection 114$_3$, from E1 connection 114$_4$ or from a data file stored on disk accessible to computer system 506, for example. Other embodiments can be configured for other input sources including, but not limited to, other multiplexed formats such as STM-1, STM-4 (622 Mbps) or STM-16 (2.4 Gbps) connections, for example. Embodiments of the invention might provide processing of even greater bandwidths. The bandwidths that can be processed by system 500 may be increased by implementing faster bus structures than are used by the present embodiment and/or increasing the number of adaptable hardware elements used on the adaptable hardware device 502, for example. Embodiments of the present invention may incorporate future adaptable hardware developments that provide greater bandwidth capability. In other words, system 500's input/output and adaptable hardware architecture are designed to provide upgradability for real-time processing of bandwidths above E3.

Figure 6:
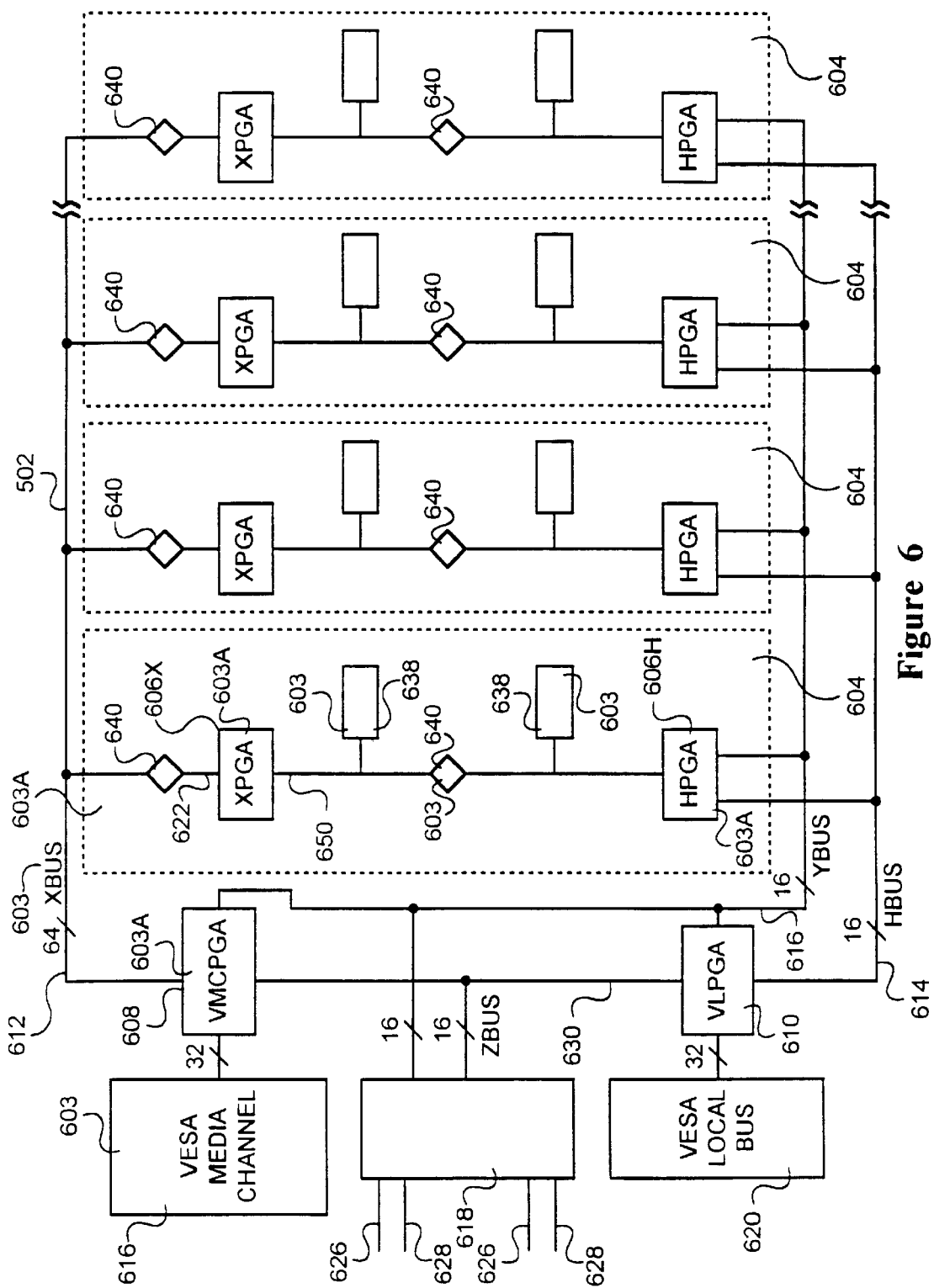
FIG. 6 illustrates an adaptable hardware device 502 that might be used with an embodiment of the present invention.

FIG. 6 shows a block diagram of an embodiment of adaptable hardware device 502. This adaptable hardware device 502, which may reside on the motherboard of server 520, consists of an array of hardware elements. FIG. 6 uses the number 603 to identify illustrative examples of hardware elements on the device 502. Hardware elements include, but are not limited to, Field Programmable Gate Arrays (FPGAs), buses, bus switches and memory, for example. Some of the hardware elements of device 502 are adaptable hardware elements 603 A. In particular, adaptable elements 603 A might be adapted to perform specific hardware functions by downloading software into them, for example. Such programming is possible with adaptable hardware elements 606X and 606H, for example. Adaptable hardware elements 606X and 606H are each implemented using a 13,000 gate FPGA. In adaptable hardware device 502, it is also possible to control the interconnection of some of the adaptable hardware elements 603 A with other elements 603, for example, using software to configure bus switches 640. Bus switches 640 can be used to control how connections are made on hardware element 612 or between adaptable hardware elements 606X and 606H, for example. In the present embodiment, hardware element 612 is the XBUS. Bus switches which provide the flexibility to transfer data in either direction or bidirectionally are desirable to complement the flexible configurability of the adaptable hardware device. Fast switches are desirable to prevent the switches from introducing any bandwidth limitations. Such bus switches are available from Quality Semiconductor, Inc. of Santa Clara, Calif.

Figure 8:
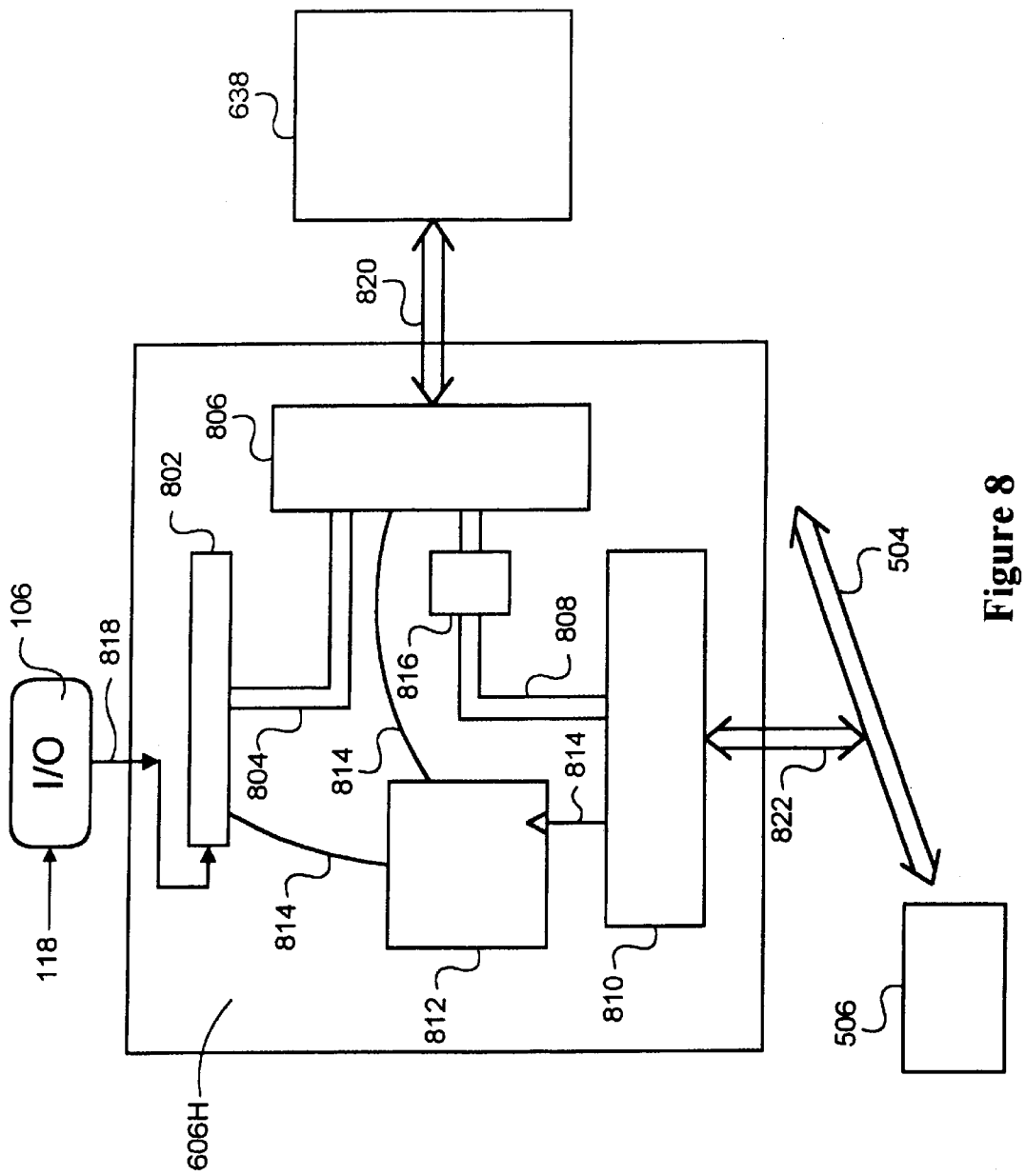
FIG. 8 is a block diagram illustrating an example of a configured FPGA.

Adaptable hardware device 502 also contains hardware elements 638 which are memory elements. The use of these memory elements 638 depends on the particular code downloaded into the adaptable memory device 502. The description of FIG. 8 provides an example.

The connections 122 and 124, shown in FIG. 5 connecting the input/output modules 106 to the adaptable hardware device 502, may be implemented using any one of connections 616, 618 or 620 of FIG. 6. Connection 616 may be a VESA Media Channel (VMC), connection 620 may be a VESA Local Bus (VLB) and connection 618 is a simple wire or multiple wire connection that may be adapted to a variety of uses. Adaptable hardware device 502 can provide a VMC interface to connection 616 using adaptable hardware element 608. Adaptable hardware element 608 is similar to the adaptable hardware elements 603X and 603H in that it can be programmed by downloading code into it. Adaptable hardware element 608 may be implemented using a 13,000 gate FPGA.

System 500 uses connection 618 and adaptable hardware element 608 to implement connections 122 and 124. Each of connections 122 and 124 comprises two wires 626 and 628 of connection 618. Wires 626 provide to the ZBUS 630 of adaptable hardware device 502 data streams recovered by input/output modules 106$_3$ and 106$_4$ from connections 114$_3$ and 114$_4$, for example. Wires 628 provide to the ZBUS 630 of adaptable hardware device 502 the clock signal recovered from these connections, for example. On adaptable hardware device 502, the ZBUS 630 carries the data streams and the clock signal from connection 618 adaptable hardware element 608. Adaptable hardware element 608 is configured to provide a VMC interface to the ZBUS 630. The code that configures element 608 in this manner can be obtained by compiling the attached FPGA 608 Schematics. These schematics are hereby incorporated herein by this reference.

As shown in FIG. 6, adaptable hardware elements 604 are coupled to hardware elements 612, 614 and 616 using hardware elements 606X and 606H. Hardware elements 612, 614 and 616 are the XBUS the HBUS and the YBUS., respectively. The particular format of the connections to these buses is determined by the configuration of adaptable hardware elements 606X, 606H, 608 and 610 according to the code downloaded into them. Hardware elements present on adaptable hardware element 604, such as adaptable elements 606X and 606H, communicate with the other System 500 components using these buses 612, 614 and 616.

As discussed, adaptable hardware device 502 communicates with computer system 506 using bus 504 shown in FIG. 5. With reference to FIG. 6, adaptable hardware device 502 implements bus 504 as a VESA Local Bus using VLB connection 620 and adaptable hardware element 610. The code to configure adaptable hardware element 610 as a VLB interface may be obtained from Giga Operations Corporation of Berkeley, Calif. This code is hereby incorporated herein by this reference. In some embodiments of the present invention, it may be desirable to maximize bandwidth of the adaptable hardware device 502 buses because device 502 is required to provide input data to the display at a real time rates. Accordingly, such embodiments should configure adaptable hardware elements to maximize the throughput of adaptable hardware device 502. While System 500 uses input/output module 514 to provide an E1 output, the remultiplexing functions accomplished by this input/output module could be accomplished using adaptable hardware device 502.

Although not shown in FIG. 6, the adaptable hardware device 502 has a capacity of up to 16 adaptable hardware elements 604, each element 604 having two FPGAs such as FPGAs 606X and 606H. FIG. 6 shows four adaptable hardware elements 604. In addition to the present elements 604 which use two 13,000 FPGAs, hardware elements 604 might be implemented with modules using two 10K gate or two 20K gate FPGAs, for example. Accordingly, a fully loaded adaptable hardware device 502 of the present embodiment would include 16 adaptable hardware elements 604 with thirty-two 20,000 gate FPGAs. If FPGA densities increase sufficiently, the adaptable hardware element 604 might be replaced by a single FPGA, or all of the adaptable hardware elements 604 might be replaced by a single FPGA. Embodiments of the present invention are not limited to the described configuration nor to FPGAs. They may rely on other types of adaptable hardware that provide the desired adaptability while maintaining desired bandwidths.

FIG. 8 is an example of how a bitstream file downloaded into an FPGA configures the FPGA. In this Figure, a bitstream file has been downloaded into FPGA 606H to configure it as a high speed snap shot buffer. The bitstream file was downloaded into FPGA 606H from computer system 506 via the computer bus 504. The information in the bitstream file, such as the place and route information, input/output definitions interconnect information and logic functions, for example, causes the FPGA 606H receiving the file to form the buffer shown in FIG. 8. The bitstream file is downloaded into FPGA 606H as described in the Xilinx Programmable Logic Data Book, 1994.

The bitstream file has created serial to parallel converter 802, dual port controller 806, computer bus interface 810, bus 804, bus 808 and control unit 812. The control unit 812 controls all of the hardware blocks within FPGA 606H through control lines such as lines 814. The serial to parallel converter 802 is coupled to dual port controller 806 through bus 804. The dual port controller 806 is also coupled to computer bus interface 810 through bus 808. The computer bus interface 810 allows computer system 506 to control the high speed snap shot buffer.

In operation, the system 506 tells the unit 812 to download a snap shot of data into RAM 638. This is the RAM 638 present on the adaptable hardware device 502. Unit 812 then causes converter 802 to read in a serial data stream from input/output module 106. The serial data stream is converted to a parallel data stream by converter 802 and sent to dual port controller 806. Unit 812 also has the dual port controller 806 transfer the data stream into RAM 638. System 506 can start, stop or request a status of the snap-shot. It can read the memory 638 where the snap-shot data is stored.

Adaptable hardware elements, such as FPGAs, may be rated by their gate density, similar to the manner in which a standard ASIC is rated. It has been determined that FPGAs having gate densities as low as approximately 10,000 gates may be used to achieve the desired operation of adaptable hardware device 502. Current FPGA densities available in production quantities vary from 4,000 to 25,000 gates. Sample 50,000 gate FPGAs are presently available from Xilinx, Inc. of San Jose, Calif. Sample 128,000 gate FPGAs may be available within a year. Embodiments of the present invention can take advantage of these increasing densities. In particular, denser adaptable hardware devices 604 might use two 25K, two 50K gate, or two 128K gate FPGA modules. FPGAs are discussed in Oldfield, J. and Dorf, R., *Field Programmable Gate Arrays. Reconfigurable Logic for Rapid Prototyping and Implementation of Digital Systems*, John Wiley & Sons, 1995, which book is hereby incorporated herein by this reference.

An additional advantage of some embodiments of the present invention is that the architecture of adaptable hardware elements may be the same at different densities. An FPGA, for example, may have an architecture that comprises a number of identical logic blocks. Please see The Programmable Logic Data Book, 1994 from Xilinx, Inc. on page 2-1, for example. These logic blocks, which may provide the basic functional building blocks for an FPGA, are programmed by downloading code into them. Because they are identical, however, the code may function the same whether it uses a first number of blocks on a 10,000 gate FPGA or the same number of blocks on a 50,000 gate FPGA. The code may only need to be recompiled for the higher density FPGA, for example. Thus, if the compiled code for processing a particular digital protocol can be downloaded into a 10,000 gate FPGA, then, in some embodiments, it will be possible to recompile and download this same code into a 128,000 gate FPGA, using only a fraction of the 128,000 gate FPGA. The remaining gates of the FPGA might be used to download other code for other functions or processing, for example. Also, a compiled code that presently must be downloaded into twelve 10,000 gate FPGAs, might be downloaded into a single 128,000 gate FPGA. Accordingly, it may be possible to use the same code that is used to program present adaptable hardware devices and/or adaptable hardware elements to program future levels of adaptable hardware devices and/or adaptable hardware elements when those future devices and/or elements use the same basic logic block. As an additional benefit, the downloaded code may run faster in the improved and/or higher density FPGAs, for example.

The adaptable hardware device 502 of System 500 has been implemented using a Giga Operations G-800 host interface board. The Giga Operations G-800 host interface board data sheet and Technical Summary are available from Giga Operations Corporation and are hereby incorporated herein by this reference. Adaptable hardware elements 604 may be implemented using Giga Operations X213MOD computing modules, for example. Adaptable hardware elements 606H and 606X may be implemented using Xilinx XC4013 FPGAs (13,000 gates), for example. In System 500, each adaptable hardware element 604 incorporates two Xilinx XC4013 FPGAs (13,000 gates). The data sheets and parts lists for the X213 MOD module and similar modules are available from Giga Operations Corporation and are hereby incorporated herein by this reference. Xilinx XC4013 FPGA data sheets are provided in The Programmable Logic Data Book, 1994 from Xilinx, Inc. of San Jose, Calif. This entire Data Book is hereby incorporated herein by this reference.

Adaptable hardware elements 608 and 610 can also be implemented using Xilinx XC4013 FPGA. The Giga Operations G-800 board uses Quality Semiconductor bus switches as shown on the G-800 schematic available from Giga Operations which schematic is hereby incorporated herein by this reference. The data sheets for these bus switches, available from Quality Semiconductor of Santa Clara, Calif. are hereby incorporated herein by this reference. The Giga Operations board also provides memory elements 638. Embodiments of the present invention are not limited this particular implementation, however, nor to any of the specific bus standards or configurations discussed. In particular, embodiments of the present invention may use other configurations as allowed by each particular application to accomplish the adaptable hardware aspects described in this specification Adaptable hardware device 502 implements code or logic for processing network information, such as data stream 118 shown in FIG. 5. In particular, the code or logic for processing network information such as data stream 118 can be stored on computer system 506. When a particular data stream hierarchy must be demultiplexed and/or de-encapsulated, the code or logic for demultiplexing and/or de-encapsulating that data stream can be downloaded from computer system 506 into the adaptable hardware device 502 and its adaptable hardware elements. This code or logic for processing network information using an FPGA is typically developed in a manner similar to that used when developing the code or logic for processing such network information using a custom ASIC. For example, the code or logic is typically developed and represented in a format such as the "C" programming language, Very High-level Description Language (VHDL) or schematic. Then, computer aided engineering (CAE) software such as that available from View Logic Corporation or Synopsis, for example, compiles this code into a format such as the XNF format. This XNF code can then be compiled using FPGA development tools, such as Xilinx's Automated CAE Tools (XACT) development system to produce a bit stream that can then be downloaded into a Xilinx FPGA. Please see section 7 of The Programmable Logic Data Book from Xilinx, 1994 for a discussion of the XACT development system and compatible CAE systems. This section is hereby incorporated herein by this reference. The compiled bit stream produced by software such as that produced by the XACT development system will typically contain "place and route" information which the FPGA uses to determine which cells are programmed using what code. The bit stream also contains interconnect information, logic functions and input/output definitions. Accordingly, downloading this bitstream into the FPGA produces the gate layout to process the network information in the desired manner.

Presently existing code and schematics for demultiplexing and de-encapsulating network information are described below and are attached in the Appendices. This code is hereby incorporated herein by this reference. Each of these codes can be compiled in the manner described to produce a bit stream that can be downloaded into one of the Xilinx FPGAs used by the present embodiment.

Additional code can be developed to demultiplex and/or de-encapsulate other data streams. Embodiments of the present invention also might use code to process network information in other ways. For example, an adaptable network processor might be developed which multiplexes, demultiplexes, encapsulates, de-encapsulates and routes network information, or which accomplishes some combination of these functions, for example. An advantage of some embodiments of the present invention is that they are flexible and can be modified to accomplish different types of network processing. Accordingly, some embodiments of the present invention may be adapted to provide different types of processing that may be required in future telecommunications systems. Also, the system 500 software enables an operator to modify or add the code to process variant or new protocols, for example. Please see Chapters 8 and 9 of the PAWS/AS-49 User's Manual, which is attached in Appendix B in the microfiche appendix, for a more detailed discussion of how this might be done. These chapters are hereby incorporated by this reference.

Because the code or logic for demultiplexing and/or de-encapsulating data streams is downloadable during operations into adaptable hardware device 502, System 500 may flexibly adapt in real time to handle different multiplexing and/or de-encapsulation formats. In particular, adaptable hardware device 502 provides the flexibility and/or reconfigurability similar to that often associated with software implementations of the code or logic for processing network information. Because device 502 uses adaptable hardware, such as FPGAs, to demultiplex and/or de-encapsulate these data streams, however, it provides speed advantages similar to those often associated with ASIC implementations of network processing code or logic, for example. Accordingly, embodiments of the invention using adaptable hardware devices may enable real time adaptation and/or real time processing of data streams having a wide variety of or frequently changing multiplexing formats and/or encapsulations even at gigabit per second or higher data rates, for example. Some embodiments of the invention might implement other system functions, including basic Operating System functions, such as those accomplished by Windows NT™, in the adaptable hardware. Such an implementation may provide desired speed advantages in some embodiments of the present invention.

The following example illustrates how a system 500 might be used to analyze network information. In particular, the file menu of Graphical User Interface generated by software 700 enables a user to select the input he or she would like to analyze. Accordingly, the user may select the E3 data stream 118 for analysis. Upon selecting the E3 data stream, system 500 will prompt the user with the option to auto-detect the format of the data stream. By selecting auto-detect, the system 500 will automatically determine the multiplexing format of data stream 118 and will download into the FPGAs the code that demultiplexes this format. Once this code has been loaded into the FPGAs, the user will be able to display the data from individual demultiplexed channels in real time. Please see the PAWS/AS-49 users manual for a detailed discussion of the display options offered by system 500. If a channel contains an ATM protocol, the System 500 will also determine this information in response to the "auto-detect" command.

At this point, in the present embodiment, the user will be prompted with the option "analyze snap shot." This option enables the user to determine the protocol hierarchy or encapsulation format of each channel. Although the system will automatically recognize the ATM protocol when using auto-detect, the system 500 generally is not configured to automatically analyze the protocol hierarchy upon selecting auto-detect. Other embodiments of the invention, however, might be configured to analyze automatically the complete protocol hierarchy, for example. In particular, other embodiments of the invention might, upon selecting autodetect, automatically determine the entire multiplexing and protocol format. Other embodiments of the invention might allow a variety of combinations of analysis and display options depending on the requirements of a particular application.

A user of system 500 might determine the protocol hierarchy of a channel's data stream as follows. After the autodetect has determined the multiplexing format of the data stream the user would select the "analyze snap-shot" command when prompted with the option. Upon selecting this command, system 500 will determine and display the lowest level protocol formats of the data of each of the demultiplexed channels. A repeated selection of the "analyze snap-shot" command after this initial snap-shot will determine the next level protocol format encapsulated within the lowest level format. Additional repeated selections of the "analyze snap-shot" command enable the user to determine the complete encapsulation hierarchy and obtain and indication of the type of data that had been encapsulated. Again, please see the PAWS/AS-49 User's Manual in Appendix B in the microfiche appendix for a discussion of how this information can be displayed.

After selecting auto-detect, the present system 500 embodiment will not automatically adapt to process a different data stream format even if the format of the data stream at the selected input changes. In other words, system 500 does not monitor the selected input to verify that the system is using the correct code to demultiplex the data stream. System 500 only determines the multiplexing format of the input data stream and downloads the appropriate code into the adaptable hardware device when auto detect is selected. Other embodiments of the present invention, however, could monitor the selected input and automatically reconfigure the adaptable hardware device to demodulate and/or de-encapsulate a data stream whose format has changed. Embodiments of the present invention might be programmed to monitor the data stream for changes in multiplexing formats, encapsulation formats or both, for example.

Figure 7:
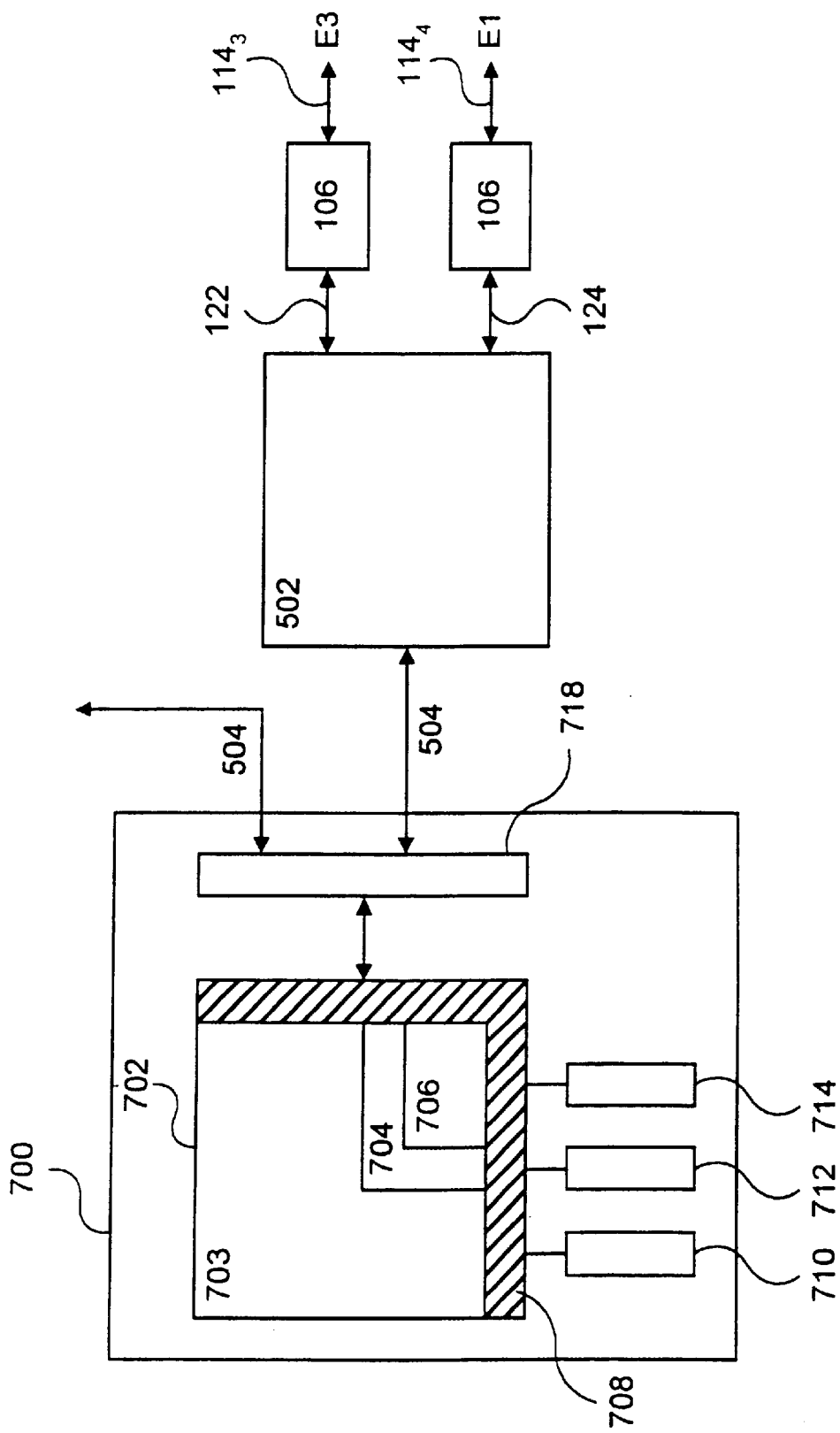
FIG. 7 is a block diagram of the software 700 used by system 500.

The software 700 run by System 500 to accomplish the present embodiment is attached in Appendix C in the microfiche appendix. All of this software is hereby incorporated herein by this reference. FIG. 7 is a block diagram of this software 700 as implemented in System 500.

Illustrated in FIG. 7, box 708 is the Windows NT operating system from Microsoft Corporation and used with the system 500. This operating system provides System 500 with a demand multitasking operating system.

Box 702, which includes boxes 703, 704 and 706 (but not box 708) is the main Network Processing software routines. This box consists of Graphical User Interface (GUI) routines 703, protocol objects and supplemental protocol object routines 704 and adaptive hardware element routines 706.

The GUI code is attached in Appendix C in the microfiche appendix. This code is hereby incorporated herein by this reference. This code creates the graphical user interface of System 500 the operation of which is described in detail in the attached PAWS/AS-49 users manual. This group of software routines integrates the operation of software routines in boxes 703, 704, 706, 710, 712, 714 and 718 and also provides the human interface to the System 500. All human-system 500 interaction is provided by menus and prompts which may be operated using either the system mouse or keyboard. Questions concerning user decisions are displayed on the system monitor.

Following is a list of the file names that are part of the GUI 703:

| | | |
|---|---|---|
| bkstore.c | hgraf.c | showtime.c |
| dirfuncs.c | Hlp2.c | starmap.c |
| dispsact.c | msg.c | strccmp.c |
| ds.c | pawsscpan.c | xpaws.c |
| elgraf.c | pawsdscr.c | |
| elstripe. c | pawslgrf.c | |
| fft.c | pawsmpan.c | |
| gf.c | pawsrast.c | |
| gfdetl.c | pawsrpt.c | |
| gffile.c | pawstarg.c | |
| gfhist.c | pawswidg.c | |
| gfinput.c | pawswork.c | |
| gfnods.c | Paws_mmi.c | |
| gfraw.c | Paws_mmi_hdlrs.c | |
| gfspect.c | pgb.c | |
| gfxpm.c | pgbraw.c | |
| grcolors.c | pgbxtrc.c | |
| As49dmmi.h | msg.h | |
| as49elds.h | pawsscpan.h | |
| bkstore.h | pawsdscr.h | |
| dirfuncs.h | pawsfile.h | |
| ds.h | pawshlp2.h | |
| gendefs.h | pawslgrf.h | |
| gf.h | pawsmmi.h | |
| gfdetl.h | pawsrast.h | |
| gfhist.h | pawsrpt.h | |
| gfpan.h | pawswork.h | |
| gfnods.h | Paws_mmi.h | |
| gfraw.h | pgb.h | |
| gfspect.h | pl.h | |
| gfxpm.h | proto.h | |
| grcolors.h | starmap.h | |
| hgraf.h | strap.h | |
| Hlp2.h | xpaws.h | |

The protocol objects and supplemental protocol object routines 704 are attached in Appendix D in the microfiche appendix. This code in Appendix D in the microfiche appendix is hereby incorporated herein by this reference. These objects and supplemental routines 704 generally provide the capability to analyze which protocols are present on data streams being processed by system 500. They evaluate data streams to identify protocols. A particular object might look for and identify video teleconferencing, Frame Relay or ATM, for example. The implementation of digital protocols as small software objects allows the standard seven-layer Open Systems Interconnection (OSI) model and multi-encapsulated protocols to be processed by system 500. In other words, it provides the flexibility to analyze a variety of different and possibly changing encapsulation schemes, for example. These objects are used by system 500's software whenever the user selects an option that requires analysis of protocols.

They can perform the following operations: Process a specific data stream, optionally output a unique data stream, reporting recognition of a protocol, optionally produce a graphical raster of the protocol, optionally produce an ASCII report of the protocol. The currently available digital protocols include recognition and/or processing of digital data, X.25, X.50/X.51, LAPF, LAPB, LAPD, HDLC, SDLC, V. 110, PPP, ATM, ATM AAL(0, 1, 3/4, and 5), and ATM SAAL.

Following is a list of the software modules comprising box 704, with a brief description of each:.

| filename: | pawsdefn.c |
|---|---|
| pages: | 2 |
| description: | this module defines all of the protocol objects which are handled by the software. New protocols are added to this file as they are developed. |
| filename: | pawstarg.h |
| pages: | 1 |
| description: | Header file which identifies subroutines which are used to display available protocols. |
| filename: | pawssrch.h |
| pages: | 2 |
| description: | Header file which identifies the subroutines which are used to control the search configuration. This module controls what protocols will be checked and in what order. |
| filename: | pawssrch.c |
| pages: | 21 |
| description: | this module does a search on channel strappings. It includes a list of the channel strappings, and the order of searching. The configuration file called PawsSearch.cfg is accessed by this module to store channel strapping information. |
| filename: | pawscact.c |
| pages: | 20 |
| description: | this module contains the functions related to determining the type of data on a channel. E.g analog, digital, linear, alaw, mulaw. |
| filename: | pawscrc.h |
| pages: | 2 |
| description: | header file which defines the data structures used to process Cyclic Redundancy Check (CRC) codes. |
| filename: | pawscrc.c |
| pages: | 7 |
| description: | this module implements the code required to process different CRC sizes. Table based implementation. |
| filename: | pawxprot.c |
| pages: | 16 |
| description: | this module contains routines which schedules the order in which protocol objects are executed when analyzing single and strapped channels |
| filename: | pawsdbas.c |
| pages: | 6 |
| description: | this module contains routines which set up the data bases which are used to implement bit/byte scramblers and protocol object variants |
| filename: | pawsusr.h |
| pages: | 13 |
| description: | header file which defines the data structures used by each software protocol object. This is part of the Application Programming Interface (API). The API is a specification which the user can use to create new protocol objects. |
| filename: | pmgprot.c |
| pages: | 22 |
| description: | contains routines which are used to pass parameters to software protocol objects as well as creating variants of existing protocol objects. This file is part of the API which is used to create new protocol objects |
| filename: | pawsbyte.c |
| pages: | 10 |
| description: | this module contains the routines which are used to convert and display Alaw, MuLaw, ASCII and EBCDIC byte encoding/companding standards. |

-continued

| filename: | pawsx50.c |
|---|---|
| pages: | 12 |
| description: | Software Protocol Object for the X.50/x.51 communications protocol standard. |
| filename: | pawxhdlc.h |
| pages: | 2 |
| description: | header file for the HDLC Software Protocol Object. Defines data structures, constants used by this protocol object. |
| filename: | pawsxhdlc.c |
| pages: | 21 |
| description: | Software Protocol Object for the HDLC protocol standard. Contains routines for recognition, decoding, rasters, reports, for example. |
| filename: | pawslapb.h |
| pages: | 1 |
| description: | header file for the LAPB Software Protocol Object. Defines data structures used by the protocol object. |
| filename: | pawslapb.c |
| pages: | 16 |
| description: | Software Protocol Object for the LAPB protocol standard. |
| filename: | ss7info.h |
| pages: | 5 |
| description: | header file for the SS7 Software Protocol Object. Defines data structures used by the protocol object. |
| filename: | ss7isdnu.c |
| pages: | 23 |
| description: | Software Protocol Object for the SS7-ISDN User Part protocol standard. |
| filename: | ss7sccp.c |
| pages: | 6 |
| description: | Software Protocol Object for the SS7-SCCP protocol standard. |
| filename: | ss7tup.c |
| pages: | 10 |
| description: | Software Protocol Object for the SS7-Telephone Users Part protocol standard. |
| filename: | q2110.c |
| pages: | 27 |
| description: | Software Protocol Object for Q2110 - SSCOP protocol standard. |
| filename: | q2110.h |
| pages: | 2 |
| description: | header file for the Q2110 - SSCOP Software Protocol Object. Defines data structures used by the protocol object. |
| filename: | q2931.c |
| pages: | 37 |
| description: | Software Protocol Object for ATM-Q2931 Signaling protocol standard. |
| filename: | Q2931.h |
| pages: | 4 |
| description: | header file for the ATM-Q2931 Signaling Software Protocol Object. Defines data structures used by the protocol object. |
| filename: | pawsx50.h |
| pages: | 1 |
| description: | header file for the X.50/X.51 Software Protocol Object. Defines data structures used by the protocol object. |
| filename: | pawsxss7.c |
| pages: | 15 |
| description: | Software Protocol Object for SS7 protocol standard. |
| filename: | hdlcunst.c |
| pages: | 21 |
| description: | Software Protocol Object for HDLC protocol standard. This section performs stuffing and unstuffing for the protocol object |
| filename: | oamrpt.c |
| pages: | 2 |
| description: | Operations And Maintenance (OAM) report generator. Used by various software protocol objects to generate OAM reports. |
| filename: | atmvpivci.c |
| pages: | 6 |

| | |
|---|---|
| description: | Software Protocol Object for ATM-VPI/VCI protocol standard. |
| filename: | pawsv110.c |
| pages: | 7 |
| description: | Software Protocol Object for CCITT V.110 protocol standard. |
| filename: | pawssdlc.c |
| pages: | 12 |
| description: | Software Protocol Object for SDLC protocol standard. |
| filename: | pawsvidt.c |
| pages: | 10 |
| description: | Software Protocol Object for H.221 protocol standard. |
| filename: | pawsxxx.c |
| pages: | 10 |
| description: | Software Protocol Object for the RUBERT HDLC protocol standard. |
| filename: | pawslapf.h |
| pages: | 1 |
| description: | header file for the LAPF Software Protocol Object. Defines data structures used by the protocol object. |
| filename: | pawslapf.c |
| pages: | 24 |
| description: | Software Protocol Object for the LAPF protocol standard. |
| filename: | pawslapd.h |
| pages: | 1 |
| description: | header file for the LAPD Software Protocol Object. Defines data structures used by the protocol object. |
| filename: | pawslapd.c |
| pages: | 15 |
| description: | Software Protocol Object for the LAPD protocol standard. |
| filename: | pawsppp.c |
| pages: | 11 |
| description: | Software Protocol Object for the PPP protocol standard. |
| filename: | atmcrc.c |
| pages: | 5 |
| description: | Routines which perform ATM CRC calculations, used by the various ATM Software Protocol Objects. |
| filename: | atm.h |
| pages: | 8 |
| description: | header file for the ATM Software Protocol Object. Defines data structures used by the protocol object. |
| filename: | atm.c |
| pages: | 58 |
| description: | Software Protocol Object for the ATM protocol standard. |
| filename: | aal.h |
| pages: | 6 |
| description: | header file for the ATM-AAL Software Protocol Object. Defines data structures used by the protocol object. |
| filename: | aal.c |
| pages: | 63 |
| description: | Software Protocol Object for the ATM-AAL34 Software Protocol Object. |
| filename: | aalgathr.c |
| pages: | 13 |
| description: | Routines which are called by the various ATM Software Protocol Objects to perform report generation and de-encapsulation of different ATM data streams. |
| filename: | aalrprt.c |
| pages: | 14 |
| description: | Routines which are called by the various ATM-AAL Software Protocol Objects to report on payload contents of the AALs. |

Box 706 represents software routines related to the adaptive hardware of system 500. The adaptive hardware routines 706 are attached in Appendix E in the microfiche appendix. These routines are hereby incorporated herein by this reference. They provide the software 700 with access to the adaptable hardware device 502. Examples of the software modules found in 706 are routines which calculate the size of a real time snapshot, and man-machine interface (MMI) code which allows real time interaction with the adaptable hardware.

The following is a list and brief description of the software modules included in 706.

| | |
|---|---|
| filename: | pawsin.c |
| pages: | 1 |
| description: | Routines which calculate the size of a real time snapshot. |
| filename: | pawsin.h |
| pages: | 1 |
| description: | Header file which defines the data structures used by the real time snapshot code. |
| filename: | as49_mmi.c |
| pages: | 3 |
| description: | Graphical user interface code which requests the user to select the auto-detect, or pre-built bit files. |
| filename: | as49_mmi.h |
| pages: | 1 |
| description: | header file which defines the data structures used by the auto-detect and pre-built bit file menus |
| filename: | as49dmmi.c |
| pages: | 7 |
| description: | code which creates the user interface menu that controls the demultiplexing of an E1 stream from the input E3 stream |
| filename: | as49ds.c |
| pages: | 14 |
| description: | code which creates a task which acquires real time data from the G800 card. This code also downloads the recommended BIT files into the G800 card. Used during auto-detect and during real time operation. |
| filename: | as49ds.h |
| pages: | 1 |
| description: | header file which defines the data structures used by the task which downloads and processes real time data from the G800 card. |
| filename: | as49elds.c |
| pages: | 10 |
| description: | code which creates a task which acquires real time data from the E1 card. |
| filename: | as49eldx.c |
| pages: | 8 |
| description: | code which controls the E3 to E1 demultiplexing |
| filename: | as49snap.c |
| pages: | 3 |
| description: | code which is used during auto-detect which performs a snapshot of raw data for analysis later. Downloads the auto-detect BIT files to the G800. |
| filename: | as49cfg.c |
| pages: | 6 |
| description: | code which reads the bitfile configuration file. This reads and parses the configuration code. |
| filename: | as49cfg.h |
| pages: | 2 |
| description: | header which defines the data structures used to access the bit file configuration file. |
| filename: | as49.c |
| pages: | 17 |
| description: | code which handles the graphical user interfaces buttons and menus used during real-time AS49A operation. |

-continued

| filename: | as49.h |
|---|---|
| pages: | 1 |
| description: | header file which defines the data structures used when handling the GUI during real-time operation. |
| filename: | rawe3n~1.c |
| pages: | 46 |
| description: | Analysis routines which take a snapshot of an input and analyzes to determine the multiplexing structure as well as any ATM protocols. Used when a user requests a auto-detect. |
| filename: | rawe3n~1.c |
| pages: | 3 |
| description: | header file which contains data structures used by the analysis routines used during auto-detect. |
| filename: | pgblive3.c |
| pages: | 7 |
| description: | routines which create and manage real time data buffers used in communication with the G800 card. |
| filename: | pgblive3.h |
| pages: | 1 |
| description: | header file which defines the data structures used during the creation and management of real time data buffers. |
| filename: | e3gfdrv.c |
| pages: | 10 |
| description: | code which manages the real time display of E3 data. |
| filename: | e3gfdrv.h |
| pages: | 1 |
| description: | header file which defines the data structures used during real time display of the E3 data. |
| filename: | e3graf.c |
| pages: | 4 |
| description: | code which controls synchronization when real time histogram data is displayed on the screen. |
| filename: | e3graf.h |
| pages: | 1 |
| description: | header file which defines the data structures used when real time histogram data is displayed on the screen. |
| filename: | e31gfdrv.c |
| pages: | 8 |
| description: | plotting code used to set up E3 and E1 screens |
| filename: | e31gfdrv |
| pages: | 1 |
| description: | header file which defines the data structures used when plotting E3 and E1 screens. |
| filename: | gfpan.c |
| pages: | 19 |
| description: | handles the screen features on the E3 and E1 screens. E.g. depth control, scroll bars, for example. |
| filename: | gpfan.h |
| pages: | 1 |
| description: | header which defines data structures used to handle on screen widgets for E3 & E1 screens. |
| filename: | pgbe3.c |
| pages: | 7 |
| description: | code which creates and manages real time buffers which come from the E3. I.e. splits E3 into 16 E1 extract buffers. |
| filename: | pgbdemx.c |
| pages: | 6 |
| description: | routines which manage demux buffers in real time. |
| filename: | elgfdrv.c |
| pages: | 10 |
| description: | routines which control and manage real time E1 display plotting |

-continued

| filename: | elgfdrv/j |
|---|---|
| pages: | 1 |
| description: | header file which defines the data structures used during real time E1 display plotting |
| filename: | elactive.c |
| pages: | 1 |
| description: | routines which manage interaction between E1 display and E3 display status information |
| filename: | rawxprot.c |
| pages: | 4 |
| description: | Software Protocol Object for raw auto-detect files. |
| filename: | pgbdeco.c |
| pages: | 6 |
| description: | routines used to manage the decode buffers from the real time input buffers |
| filename: | elgraf.h |
| pages: | 5 |
| description: | header file which defines the data structures used in displaying E1 screen data. |
| filename: | e31graf.h |
| pages: | 1 |
| description: | header file which defines the data structures used in displaying E1 and E3 screen data. |
| filename: | pgbe3.h |
| pages: | 1 |
| description: | header file which defines the data structures used to control the E3 extract buffers. |
| filename: | pawsmpan.h |
| pages: | 2 |
| description: | header file which defines the X windows call back routines used to display data onto the screen. |
| filename: | e3gfdrv.h |
| pages: | 1 |

Boxes 710, 712 and 714 represent supplemental code used by the Network Processing software 702 to accomplish the above described functions.

Box 712 represents the bitstream files generated by the CAE and XACT development tools, for example, as described above. Rather than attaching the lengthy bitstream files, the VHDL, C language and schematic files used to generate the bitstream files have been attached. The bitstream files can be generated from the attached files in the manner described above. The files in box 712 are hereby incorporated herein by this reference.

VHDL source code files are attached in Appendix F. The following is a list of these files in "VHDL" source code, including the filenames and a brief description of each:
AUTODETECT function implemented on the FPGA 606H consists of the following modules:

MINE.VHD
PKPK.VHD
RAM.VHD
WE.VHD
FIFO.VHD
DC.VHD

HISTOGRAM function implemented on the FPGA 606H consists of the following modules:

E1HGYPGA.VHD
FIFO32.VHD
HISTA.VHD
INCBIN.VHD
POKE.VHD

RAND.VHD
SIGGEN.VHD
TIMESLICE.VHD
CLIPINC.VHD
DC_CH.VHD
SNAPSHOT Autodetect for the ATM OC-3 input port on the FPGA 606H consists of the following modules:
RTSNAPPY.VHD
BURSTY.VHD
DECGEN.VHD
HDRGEN.VHD
INCGEN.VHD
MEMSHARE.VHD
PRBSGEN.VHD
PRBSGENA.VHD
RDWRRAM VHD
RM16×8H.VHD
RTFIFO32.VHD
RTINPUTY.VHD
RTINSYNC.VHD
WR_WRDS.VHD
ATM_GEN.VHD
The following is a list of these files in schematic format:
E2 to Channels demux (positive/zero/negative justification) for the FPGA 606X
E1 to Channels demux for the FPGA 606X
E2 to E1 demux for the FPGA 606X
E2 to E1 demux (positive/zero/negative justification) for the FPGA 606X
E1 to Channels (positive/zero/negative justification) demux for the FPGA 606X
E3 to ATM demux for the FPGA 616
E2 to Channels demux for the FPGA 606X
E3 to E2 demux for the FPGA 608
Autodetect Pass-thru for the FPGA 606X

Box 710 represents a configuration file. This file is a text file that lists the bitstream files available to the system 500. When new files are added, the configuration file can be edited with a text editor to add the name of the new files. The GUI routines use this file to produce a menu that allows the user to select a particular de-encapsulation routine.

Box 714 is code that is able to identify the multiplexing format of a data stream. This code is attached in file RAWE3N1.C. This code is hereby incorporated herein by this reference. The process used by these codes to accomplish this function is described in the attached papers entitled, "Payload Identification Algorithm and Synchronous Digital Hierarchy: Payload Identification Strategies." These papers are attached in Appendix G in the microfiche appendix and are hereby incorporated herein by this reference.

Box 718 represents the drivers for the adaptable hardware device 502 and for computer system 506. These drivers perform communications and control tasks between the adaptable hardware device 502 and the software 700. They are attached in Appendix H in the microfiche appendix and are hereby incorporated herein by this reference.

There are three categories of drivers used and are listed by file name below.
GENERAL DRIVERS
  GENDEFS.H
  FIFOBUF.H
  FIFOBUF.C
  COMLOG.H
  COMLOG.C
G800 DRIVERS
  XPICLIB.H
  X800LIB.H
  SNAPGRAB.H
  SNAPGRAB.C
  G8SNAP.C
  G8INT.C
  G8APPSIM.H
  G8APPR.C
  G8APPI.H
  G8APPH.C
  G8APPD.C
  G8APP.H
  G8APP.C
  G800FMT.H
  G800DRV.H
  G800DRV.C
  X800LIB.H
E1 DRIVERS
  GLERR.H
  GLE1R.C
  GLELPAT.H
  GLE1PAT.C
  GLE1LOG.H
  GLE1I.H
  GLE1H.C
  GLE1DEMX.H
  GLE1DEMX.C
  GLE1ATST.C
  GLE1APP.H
  GLE1APP.C
  GLE1.H
  GLE1.C An Application Programming Interface (API) is available which allows the user to write his own protocol objects, as well as to quickly produce variants on existing protocols. System 500 is designed to permit the user to program and test digital protocols using the protocol object API on snapshot data in order to refine and test the digital protocol. Please see Chapters 8 and 9 of the PAWS/AS-49 User's Manual for a more detailed description.

The system 500 embodiment of the present invention implements a histograming engine within adaptable hardware device 502. The VHDL code for this engine can be found in the file hista.vhd. This file was referenced earlier as a VHDL bitstream file and is attached in Appendix F in the microfiche appendix. The present implementation is capable of providing real time histograming on all 512 channels within a E3 data stream, for example. This capacity may be expanded in other implementations to larger data input signals such as 2048 channels, 16000 channels, for example.

Using this technique of histograming provides a unique visual representation or pattern for digital protocols.

In particular it uses color-encoded histograms used by system 500 to provide a powerful visualization tool for examination of network data streams. The display provides immediate activity indication, visual separation of voice and data channels, and visual identification of many common digital protocols.

The display is generated by considering each channel in the data stream to be an 8-bit number. For standard PCM data streams, the sample rate in each channel is 8000 Hz. By computing a histogram over 80 samples, we thus examine 10 msec worth of data. Once the histogram has been generated, we compress it to 32 bins, using a PCM companding method. (Channels which carry analog [modem or voice] data are generally companded using the Alaw or Ulaw companding rules). The uncompanded, compressed histogram bins are then examined to find the bin with the maximum count. Each of the 32 bins is color encoded by associating a count with a color and by setting the count linearly between the minimum and maximum chosen colors, using the ratio between the count in each bin to the maximum bin count. Any bin which has a non-zero count is rounded up so that its color displays the minimum color. Any bins which have a zero count are encoded to black.

The lines so color encoded are written on the display, one under another, to form a falling-raster type of display. Thus, for any given channel, one can visually see how the nature of the display changes over time, and from that infer what sort of data stream is present in the channel. The method described above is used by system 500 for displaying 32-Channel PCM data streams, on a raster which is about 1056 pixels wide (33 pixels per channel). For E3 data streams, which contain 512 channels, a perfectly useable display is generated by further compressing the data to only 8 bins prior to the color encoding. This allows immediate visualization of the full 512 channels in the E3, by displaying four waterfalls, each with 128 channels.

When such a display is viewed, voice signals are clearly identifiable, for example, since the amplitude of the voice varies over time as syllables and pauses are spoken. Modems, for example are seen as rather constant amplitude channels, with the outer edges brighter than the middle, due to the mathematical nature of histograming a sinusoidal signal (such as a modem). HDLC-encoded data streams, for example, have bursty appearances, with some periods of quiescence followed by periods where the histogram is spread fairly uniformly over the channel. Signaling System 7, for example, has a uniquely identifiable pattern caused by the continuous transmission of Fill-In Signal units, with the counting sequences which are part of that protocol. The result of the sequencing is that sections of the display are identical until the sequence number changes, and then the histogram pattern changes to something else, and remains that way for a time until the sequence number changes again. Please see the PAWS/AS-49 User's Manual, the AS-49A PCM Protocol Server data sheets or the AS-1860 data sheets for illustrations of these histograms.

Finally, the display provides a powerful method for determining whether or not channels in the PCM data stream are strapped together (to form higher-data-rate channels). By observing the display, and noting approximate time correlations between channels when the nature of the displayed data stream changes, one can readily infer whether strapping is possible and worth further investigation. Accordingly, system 500 enables the user to analyze both strapped and un-strapped channels. Please see the PAWS/AS-49 User's Manual for a more detailed discussion of strapped/un-strapped channel analysis.

As we have noted, system 500 may use ARGOSystems PAWS software to implement the software in an embodiment of the present invention. Embodiments of the present invention are not limited to this software, however. They may include any software that could be used to implement the adaptable network processing aspects disclosed in this specification. Embodiments of the invention may not even use software to program adaptable hardware devices. Other adaptable hardware devices that are presently or that may in the future become available can be used to implement the present invention.

Appendix I in the microfiche appendix contains the AS-49 parts list.

Appendix J in the microfiche appendix contains the make file for the software 700.

While the invention has been described in terms of what is presently considered to be the preferred embodiments, the invention is not limited to or by the disclosed embodiments. The person of ordinary skill will readily appreciate that the invention can be applied beyond the particular systems mentioned as examples in this specification. The invention comprises all embodiments within the scope of the appended claims and/or supported by the disclosure.

What is claimed is:

1. A network processor comprising:
    a computer system;
    an adaptable hardware device having an information input wherein the adaptable hardware device provides configurable logic;
    an input/output module coupled to the information input of the adaptable hardware device such that the input/output module is adapted to provide to the information input a data stream having a protocol format wherein the adaptable hardware device is adapted to provide the data stream to the configurable logic;
    a bus coupling the adaptable hardware device to the computer system wherein the computer system is adapted to communicate with the adaptable hardware device using the bus, wherein the computer system is adapted to configure the configurable logic of the adaptable hardware device into an analysis configuration, wherein the computer system is adapted to use the configurable logic in the analysis configuration to determine the protocol format of the data stream applied to the information input, wherein the computer system is adapted to configure the configurable logic of the adaptable hardware device into a processing configuration associated with the determined protocol format of the data stream and wherein the configurable logic in the processing configuration is adapted to process the data stream having the protocol format.

2. The network processor of claim 1, wherein the computer system is adapted to change the configuration of the configurable logic in real time, and wherein the configurable logic is adapted to be changed in real time between the analysis configuration and the processing configuration.

3. The network processor of claim 1, wherein configurable logic comprises a field programmable gate array.

4. The network processor of claim 3, wherein the field programmable gate array is adapted to be configured by the computer system to provide the analysis configuration and is adapted to be configured by the computer system to provide the processing configuration.

5. The network processor of claim 4, wherein the computer system is adapted to change the configuration of the configurable logic in real time, and wherein the configurable logic is adapted to be changed in real time between the analysis configuration and the processing configuration.

6. The network processor of claim 5, wherein the computer system is adapted to change the configuration of the configurable logic without manual input.

7. The network processor of claim 4, wherein the computer system is adapted to configure the field programmable gate array to provide the analysis configuration by downloading into the field programmable gate array an analysis configuration file and wherein the computer system is adapted to configure the field programmable gate array to provide the processing configuration by downloading into the field programmable gate array a processing configuration file.

8. The network processor of claim 1, wherein the configurable logic comprises a plurality of field programmable gate arrays.

9. The network processor of claim 8, wherein the plurality of field programmable gate arrays are adapted to be configured by the computer system to provide the analysis configuration and are adapted to be configured by the computer system to provide the processing configuration.

10. The network processor of claim 9, wherein the computer system is adapted to change the configuration of the configurable logic in real time, and wherein the configurable logic is adapted to be changed in real time between the analysis configuration and the processing configuration.

11. The network processor of claim 10, wherein the computer system is adapted to change the configuration of the configurable logic without manual input.

12. The network processor of claim 9, wherein the adaptable hardware device further comprises a configurable bus which is adapted to be configured to couple the plurality of field programmable gate arrays to provide the analysis configuration and which is adapted to be configured to couple the plurality of field programmable gate arrays to provide the the processing configuration.

13. The network processor of claim 12, wherein the computer system is adapted to configure the plurality of field programmable gate arrays and the configurable bus to provide the analysis configuration by downloading into each gate array an analysis configuration file and wherein the computer system is adapted to configure the plurality of field programmable gate arrays and the configurable bus to provide the processing configuration by downloading into each field programmable gate array a processing configuration file.

14. The network processor of claim 9, wherein the computer system is adapted to configure the plurality of field programmable gate arrays to provide the analysis configuration by downloading into each gate array an analysis configuration file and wherein the computer system is adapted to configure the plurality of field programmable gate arrays to provide the processing configuration by downloading into each field programmable gate array a processing configuration file.

15. The network processor of claim 1, wherein the computer system is adapted to change the configuration of the configurable logic without manual input.

16. The network processor of claim 1, wherein the computer system is adapted to configure the configurable logic into the analysis configuration by downloading into the configurable logic at least one configuration file associated with the analysis configuration, and wherein the computer system is adapted to configure the configurable logic into the processing configuration by downloading into the adaptable hardware device at least one configuration file associated with the processing configuration.

17. The network processor of claim 1, wherein the processing configuration is adapted to demultiplex the protocol format into a plurality of channels.

18. The network processor of claim 1, wherein
the protocol format comprises a plurality of protocol levels;
the plurality of protocol levels successively increase in level from a lowest level to a highest level;
each protocol level has a protocol format associated with the protocol level;
the computer system is adapted to configure the configurable logic into a plurality of processing configurations wherein the plurality of processing configurations include the processing configuration;
a first of the processing configurations is adapted to process the protocol format of the data stream at the lowest level; and
each of the other processing configurations is adapted to process the protocol format of the data stream at one of the levels above the lowest level.

19. The network processor of claim 18, wherein
the computer system is adapted to use the analysis configuration to determine the protocol format associated with each protocol level; and
the computer system is adapted to configure the configurable logic into each of the processing configurations in response to the determination of the protocol formats.

20. The network processor of claim 19, wherein the computer system is adapted to change configuration of the configurable logic without manual input.

21. The network processor of claim 18, wherein the protocol format of the lowest level comprises a multiplexing format.

22. The network processor of claim 21, wherein the computer system is adapted to change the configuration of the configurable logic in real time, and wherein the configurable logic is adapted to be changed in real time between the analysis configuration and each of the processing configurations.

23. The network processor of claim 22, wherein the computer system is adapted to change configuration of the configurable logic without manual input.

24. The network processor of claim 18, wherein at least one of the processing configurations is adapted to demultiplex the data stream.

25. The network processor of claim 24, wherein the processing configuration that is adapted to demultiplex the data stream is the processing configuration associated with the lowest level.

26. The network processor of claim 25, wherein the data stream is demultiplexed into a plurality of channels each channel having a protocol format.

27. The network processor of claim 26, wherein the protocol format of at least one of the channels provides the plurality of protocol levels.

28. The network processor of claim 18, wherein the protocol format of the highest level is encapsulated in the protocol format of any levels below the highest level.

29. The network processor of claim 18, wherein at least one of the processing configurations is adapted to deencapsulate a first of the protocol formats from within a second of the protocol formats.

30. The network processor of claim 18, wherein the computer system is adapted to change the configuration of the configurable logic in real time, and wherein the configurable logic is adapted to be changed in real time between the analysis configuration and each of the processing configurations.

31. The network processor of claim 30, wherein the computer system is adapted to change configuration of the configurable logic without manual input.

32. The network processor of claim 18, wherein the computer system is adapted to change the configuration of the configurable logic without manual input.

33. The network processor of claim 1, wherein the protocol format is one of a plurality of possible protocol formats identifiable by the computer system using the analysis configuration.

34. The network processor of claim 1, further comprising a plurality of configuration files that the computer system can use to provide a plurality of configurations of the adaptable hardware device.

35. A network processor comprising:

a computer system;

an adaptable hardware device having an information input wherein the adaptable hardware device provides configurable logic;

an input/output module coupled to the information input of the adaptable hardware device such that the input/output module is adapted to provide to the information input a data stream having one of a first and a second protocol format wherein the adaptable hardware device is adapted to provide to the configurable logic the data stream and wherein the first and second protocol formats are at different protocol levels;

a bus coupling the adaptable hardware device to the computer system wherein the computer system is adapted to communicate with the adaptable hardware device using the bus, wherein the computer system is adapted to determine the protocol format of the data stream, wherein the computer system is adapted to configure the configurable logic into a first processing configuration when the data stream has the first protocol format and wherein the computer system is adapted to configure the configurable logic into a second processing configuration when the data stream has the second protocol format, wherein the configurable logic in the first processing configuration is adapted to process the data stream having the first protocol format and wherein the configurable logic in the second processing configuration is adapted to process the data stream having the second protocol format.

36. A network processor comprising:

a computer system;

an adaptable hardware device having an information input wherein the adaptable hardware device provides configurable logic;

an input/output module coupled to the information input of the adaptable hardware device such that the input/output module is adapted to provide to the information input a data stream having a protocol format wherein the adaptable hardware device can be configured to provide the data stream to the configurable logic;

a bus coupling the adaptable hardware device to the computer system wherein the computer system is adapted to communicate with the adaptable hardware device using the bus, wherein the computer system is adapted to determine the protocol format of the data stream without manual input that identifies the protocol format of the data stream, wherein the computer system is adapted to configure the configurable logic into a processing configuration and wherein the configurable logic in the processing configuration is adapted to process the data stream having the protocol format;

a plurality of configuration files that the computer system can use to provide a plurality of hardware configurations of the adaptable hardware device.

* * * * *